(12) United States Patent
Richard et al.

(10) Patent No.: US 9,996,766 B2
(45) Date of Patent: Jun. 12, 2018

(54) IMAGING-BASED METHODS FOR DETECTING AND MEASURING DEFECTS IN EXTRUDED CELLULAR CERAMIC ARTICLES

(71) Applicant: CORNING INCORPORATED, Corning, NY (US)

(72) Inventors: DiRisio Carlo Richard, Corning, NY (US); Frey Julie Charmaine, Corning, NY (US); Gehl Kristine Sluder, Big Flats, NY (US); Russell Wayne Madara, Corning, NY (US); Hak Chuah Sim, Painted Post, NY (US); Yeqing Zhang, Penfield, NY (US)

(73) Assignee: Corning Incorporated, Corning, NY (US)

( * ) Notice: Subject to any disclaimer, the term of this patent is extended or adjusted under 35 U.S.C. 154(b) by 25 days.

(21) Appl. No.: 15/139,931

(22) Filed: Apr. 27, 2016

(65) Prior Publication Data
US 2016/0321797 A1 Nov. 3, 2016

Related U.S. Application Data

(60) Provisional application No. 62/155,853, filed on May 1, 2015.

(51) Int. Cl.
*G06K 9/00* (2006.01)
*G06K 9/40* (2006.01)
(Continued)

(52) U.S. Cl.
CPC ......... *G06K 9/4661* (2013.01); *G06K 9/4604* (2013.01); *G06K 9/52* (2013.01);
(Continued)

(58) Field of Classification Search
CPC .. G06K 9/4661; G06K 9/4604; G06K 9/6215; G06K 9/52; G06T 7/0006; G06T 2207/30164
(Continued)

(56) References Cited

U.S. PATENT DOCUMENTS 5,694,228 A 12/1997 Peairs et al.
6,282,309 B1 8/2001 Emery
(Continued)

FOREIGN PATENT DOCUMENTS

CN 101437597 5/2012
CN 101539532 1/2013
(Continued)

*Primary Examiner* — Sheela C Chawan
(74) *Attorney, Agent, or Firm* — Joseph M. Homa

(57) ABSTRACT

Imaging-based methods for detecting defects in an extruded cellular ceramic article having a web array are disclosed. The methods may include capturing a digital image of the web array to establish an intensity-based initial web array representation. The methods also may include performing an intensity threshold process on the initial web array representation to define an intensity-based high-resolution web array representation having sub-pixel resolution, and performing piecewise cubic spline fits to define corresponding web skeletons. The method may also include comparing intensities of the high-resolution web array representation along the web skeletons to a threshold intensity to determine the defect locations and sizes. The methods can be applied to determining the size and location of skin defects as well.

10 Claims, 16 Drawing Sheets

(51) Int. Cl.
  *H04N 7/18* (2006.01)
  *G01N 21/00* (2006.01)
  *G06K 9/46* (2006.01)
  *G06K 9/62* (2006.01)
  *G06K 9/52* (2006.01)
  *G06T 7/00* (2017.01)

(52) U.S. Cl.
  CPC .......... *G06K 9/6215* (2013.01); *G06T 7/0006* (2013.01); *G06T 2207/30164* (2013.01)

(58) Field of Classification Search
  USPC ....... 382/100, 141, 152, 144, 118, 147, 274, 382/275, 278, 145, 172, 191, 192, 193, 382/194; 348/92, 125, 128, 133, 134; 356/601, 337, 437, 402, 608, 602, 237.1, 356/237.2, 237.3, 237.4, 237.5, 237.6; 428/116, 131, 156, 174, 188, 593
  See application file for complete search history.

(56) References Cited

U.S. PATENT DOCUMENTS

| | | | |
|---|---|---|---|
| 6,584,218 B2 | 6/2003 | Wihl et al. | |
| 6,809,809 B2 | 10/2004 | Kinney et al. | |
| 6,820,032 B2 | 11/2004 | Wenzel et al. | |
| 6,836,560 B2* | 12/2004 | Emery | G01N 21/95607 356/237.6 |
| 7,126,681 B1 | 10/2006 | Chen et al. | |
| 7,133,574 B2* | 11/2006 | Minami | G01N 21/95692 382/291 |
| 7,206,443 B1* | 4/2007 | Duvdevani | G06K 9/00973 382/141 |
| 7,307,431 B2 | 12/2007 | Safai et al. | |
| 7,366,340 B1* | 4/2008 | Smithgall | G01N 21/95692 264/177.12 |
| 7,499,156 B2 | 3/2009 | Chen et al. | |
| 7,519,222 B2 | 4/2009 | Kisilev et al. | |
| 7,664,310 B2 | 2/2010 | Emery | |
| 7,674,309 B2 | 3/2010 | Gargano et al. | |
| 7,679,738 B2 | 3/2010 | Nagatoshi et al. | |
| 8,049,878 B2 | 11/2011 | Zoeller, III | |
| 8,134,759 B2 | 3/2012 | Albahri | |
| 8,174,689 B2 | 5/2012 | Akao et al. | |
| 8,213,733 B2* | 7/2012 | Kato | H04N 1/60 345/589 |
| 8,281,661 B2 | 10/2012 | Olivier et al. | |
| 8,281,999 B2 | 10/2012 | Antognini et al. | |
| 8,285,027 B2 | 10/2012 | Zoeller, III | |
| 8,319,978 B2 | 11/2012 | Ben-Levi et al. | |
| 8,340,536 B2 | 12/2012 | Paul et al. | |
| 8,421,857 B2 | 4/2013 | Akao et al. | |
| 8,422,014 B2 | 4/2013 | Hatano et al. | |
| 8,442,299 B2 | 5/2013 | Longo et al. | |
| 8,488,181 B2 | 7/2013 | Wu et al. | |
| 8,493,558 B2 | 7/2013 | Asada et al. | |
| 8,537,215 B2* | 9/2013 | Booth | G01N 21/95692 348/125 |
| 9,561,622 B2* | 2/2017 | Das | G03F 7/70416 |
| 2003/0095252 A1 | 5/2003 | Mainberger | |
| 2004/0223638 A1 | 11/2004 | Lespinet et al. | |
| 2005/0152616 A1 | 7/2005 | Bailey | |
| 2009/0141132 A1 | 6/2009 | Lehmann et al. | |
| 2009/0236542 A1 | 9/2009 | Wallis | |
| 2010/0274525 A1 | 10/2010 | Zoeller, III | |
| 2011/0122459 A1 | 5/2011 | Do et al. | |
| 2011/0128370 A1 | 6/2011 | Booth et al. | |
| 2013/0038850 A1 | 2/2013 | Feldmann et al. | |
| 2013/0212051 A1 | 8/2013 | Stephens, II et al. | |
| 2015/0374557 A1 | 12/2015 | Varga et al. | |

FOREIGN PATENT DOCUMENTS

| | | |
|---|---|---|
| GB | 1385912 | 3/1975 |
| GB | 2021274 | 11/1979 |
| JP | 58-155343 | 9/1983 |
| JP | 7-243974 | 9/1995 |
| JP | 2003-270158 | 9/2003 |
| JP | 2006-292881 | 10/2006 |
| JP | 2007-333579 | 12/2007 |
| JP | 2008-139052 | 6/2008 |
| JP | 2008-298462 | 12/2008 |
| JP | 2012-088273 | 5/2012 |
| JP | 5038293 | 10/2012 |
| JP | 2013-036989 | 2/2013 |
| JP | 2013-142669 | 7/2013 |
| KR | 2007039604 | 4/2007 |
| TW | 200848721 | 12/2008 |
| WO | 1999041621 | 8/1999 |
| WO | 2002093639 | 11/2002 |
| WO | 2008053512 | 5/2008 |
| WO | 2013085385 | 6/2013 |
| WO | 2016187180 A1 | 11/2016 |

* cited by examiner

IMAGING-BASED METHODS FOR DETECTING AND MEASURING DEFECTS IN EXTRUDED CELLULAR CERAMIC ARTICLES

CROSS-REFERENCE TO RELATED APPLICATIONS

This application claims the benefit of priority of U.S. Provisional Application Ser. No. 62/155,853 filed on May 1, 2015, the content of which is relied upon and incorporated herein by reference in its entirety.

FIELD

The present disclosure relates to extruded cellular ceramic articles, and in particular to imaging-based methods for detecting and measuring defects in such articles.

The entire disclosure of any publication or patent document mentioned herein is incorporated by reference.

BACKGROUND

Extruded cellular ceramic articles are used as particulate filters and catalytic converters in internal combustion engines. The extruded cellular ceramic article includes a web array made up of thin web walls ("webs"). The web array defines an array of densely packed cells (e.g., 15 to 200 cells per square centimeter). An outer skin may define the shape of the article and may support the internal web array. The web array provides a relatively large surface area for catalytic material to react with the exhaust gases that pass through the cells.

The mechanical or thermal integrity of an extruded cellular ceramic article can be substantially compromised by defects in the web array or skin. The web array defects may manifest in a variety of different forms, e.g., distorted cells, collapsed cells, sheared cells, missing web arrays, etc. The skin defects may present as deviations in the overall ideal contour shape, localized variations such as indentations or protrusions, or fissures.

SUMMARY

Imaging-based methods for inspecting for any defects, or detecting, defects in an extruded cellular ceramic article having a web array are disclosed.

The methods may comprise capturing a digital image of the web array to establish an intensity-based initial web array representation. The methods also may comprise performing an intensity threshold process on the initial web array representation to define an intensity-based high-resolution web array representation having sub-pixel resolution, and performing piecewise cubic spline fits to define corresponding web skeletons. The method also may comprise comparing intensities of the high-resolution web array representation along the web skeletons to a threshold intensity to determine the defect locations. The image-based methods may be used for process control, i.e., the process for forming the extruded cellular ceramic article may be adjusted to avoid the formation of defects. In an example, the methods for detecting defects are used as feedback to the manufacturing process.

An aspect of the disclosure is a method of determining a location and a size of at least one defect in an extruded cellular ceramic article having a web array comprising webs that define an array of cells. The method comprises: a) capturing a digital image of the web array, wherein the digital image comprises pixels each having an intensity value; b) establishing from the captured digital image an intensity-based initial web array representation of the web array that does not have sub-pixel resolution; c) performing an intensity threshold process on the initial web array representation to define an intensity-based high-resolution web array representation of the web array that has sub-pixel resolution; d) performing, for each of the webs, piecewise cubic spline fits between knot locations to define corresponding web skeletons; and e) comparing intensities of the high-resolution web array representation along the web skeletons to a threshold intensity to determine the location of the at least one defect.

Another aspect of the disclosure is a method of determining a location and a size of at least one defect in an extruded cellular ceramic article having a web array surrounded by an outer skin having a shape. The method comprises: a) capturing a digital image of the outer skin, wherein the digital image comprises pixels each having an intensity value; b) establishing from the captured digital image an intensity-based initial representation of the skin that does not have sub-pixel resolution; c) performing an intensity threshold process on the initial skin representation using orthogonal projections to define an intensity-based high-resolution skin representation that has sub-pixel resolution; d) defining a convex hull and a polygonal approximation of the shape of the skin using the intensity-based high-resolution skin representation; and e) determining at least a size and at least a location of at least one deviation in the skin shape between the convex hull and the polygonal approximation.

Another aspect of the disclosure is a method of determining a location of at least one non-knitter defect in an extruded cellular ceramic article having a web array comprising webs that define an array of cells. The method comprises: a) capturing a digital image of the web array, wherein the digital image comprises pixels each having an intensity value and comprises web edges; b) establishing from the captured digital image a web array skeleton that traverses the web array and that has intensity values at each point along the web array skeleton, wherein the intensity values are defined by either a maximum intensity or an average intensity between the web edges at the given point; c) determining contrast values from the intensity values of the web array skeleton; and d) comparing the intensity values and the contrast values of the web array skeleton to a non-knitter threshold intensity and a contrast threshold, respectively, to determine the location of the at least one non-knitter defect.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

Cartesian coordinates are shown in some of the Figures for the sake of reference and are not intended to be limiting as to direction or orientation.

In the discussion below, the term "ceramic article" is not limited to fired ceramic material and can comprise for example an extruded ceramic greenware log and a dried ceramic greenware log.

Figure 1:
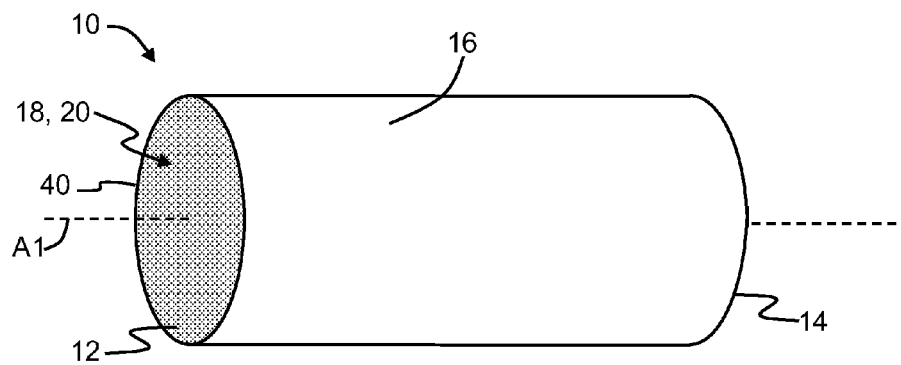
FIG. 1 is a side view of an example extruded cellular ceramic article.
Figure 2:
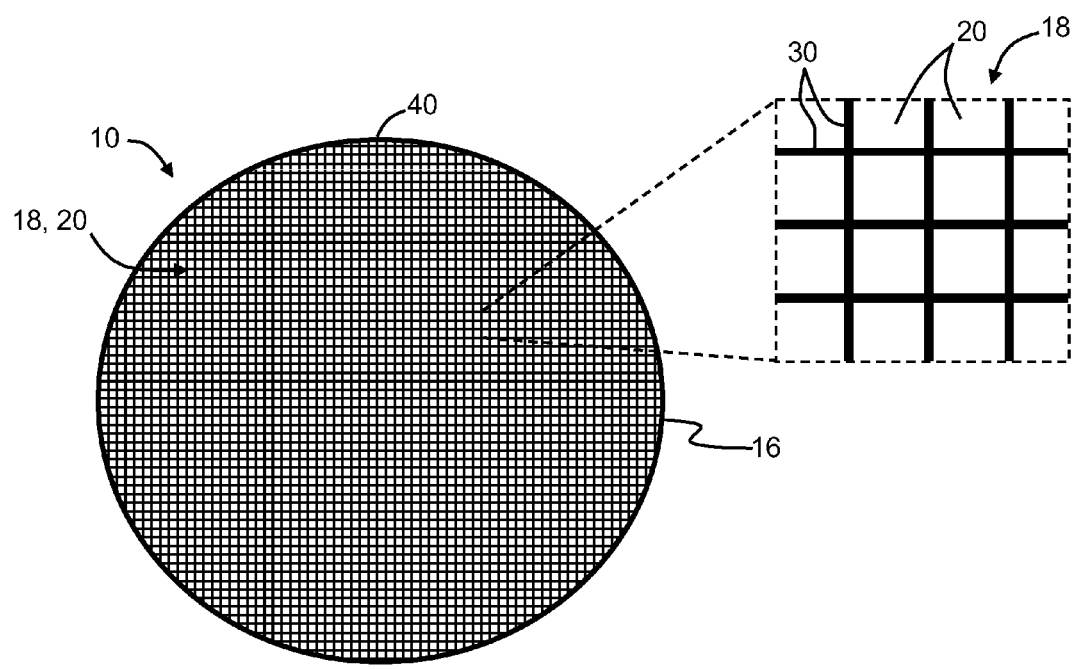
FIG. 2 is a close-up front-on view of the example extruded cellular ceramic article of FIG. 1.

FIG. 1 is a side view of an example extruded cellular ceramic article ("ceramic article") 10. FIG. 2 is a close-up, front-on view of the example ceramic article 10 of FIG. 1. The ceramic article 10 has a central axis A1, a front end 12, a back end 14, and an outer surface 16. The ceramic article 10 comprises a web array 18 comprising webs 30 that in turn define cells 20. The cells 20 can have shapes other than square, such as triangular, hexagonal, etc., depending on the type of extrusion die used to form ceramic article 10. An outer web or skin 40 defines an outer shape of ceramic article 10 as well as outer surface 16. The close-up inset of FIG. 2 illustrates an example portion of perfectly formed web array 18 with perfectly formed webs 30 that define perfect cells 20.

Figure 3A:
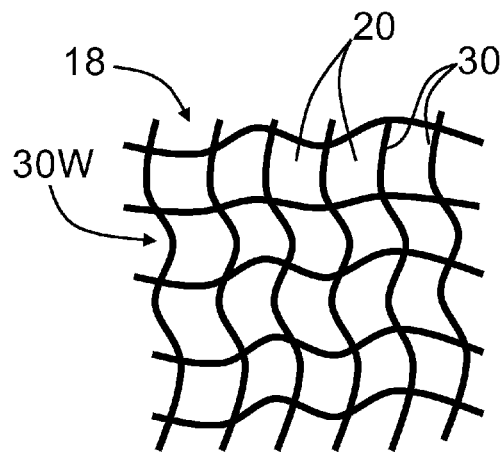
FIGS. 3A through 3E are close-up views of example web arrays of extruded cellular ceramic articles, illustrating different types of structural defects in the web array that can impact the performance of the ceramic article.
Figure 3B:
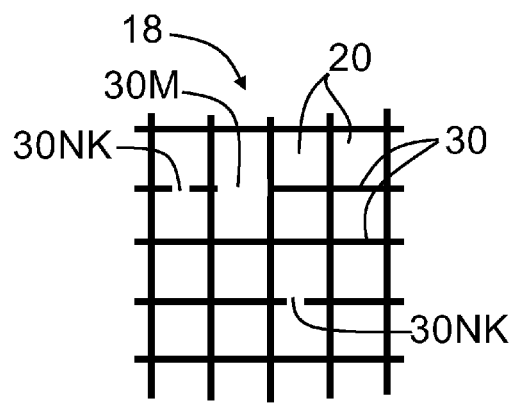
Figure 3C:
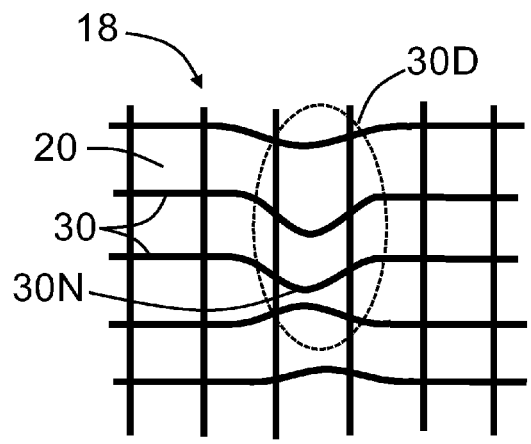
Figure 3D:
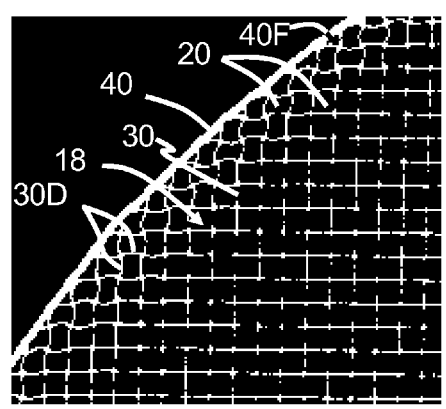
Figure 3E:
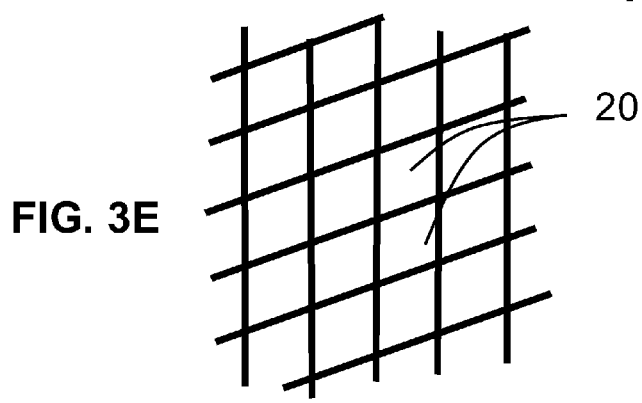

FIGS. 3A through 3E are close-up views of example web arrays 18 illustrating different types of structural defects that can reduce the isostatic strength of ceramic article 10. FIG. 3A shows web defects 30W that are in the form of "wavy" webs 30 and that form distorted cells 20. FIG. 3B shows some webs 30 having missing portions that represent non-knitter web defects 30NK, and shows a defect 30M in the form of a web that is essentially entirely missing. FIG. 3C shows an example of a local deformation defect 30D in webs 30 that results in a highly localized group of defective or deformed cells 20D with curved web defects 30D. A defect in web 30 that has extreme curvature is referred to herein as a "nodule defect 30N." FIG. 3D shows web deformation defects 30D adjacent outer web or skin 40, and also shows a fissure defect 40F in the skin. FIG. 3E shows an example of sheared cells 20.

Image Capture

An aspect of the methods disclosed herein comprises capturing an image of one end of ceramic article 10. In an example, a single captured image preferably comprises both web array 18 and skin 40 so that both can be characterized.

Figure 4A:
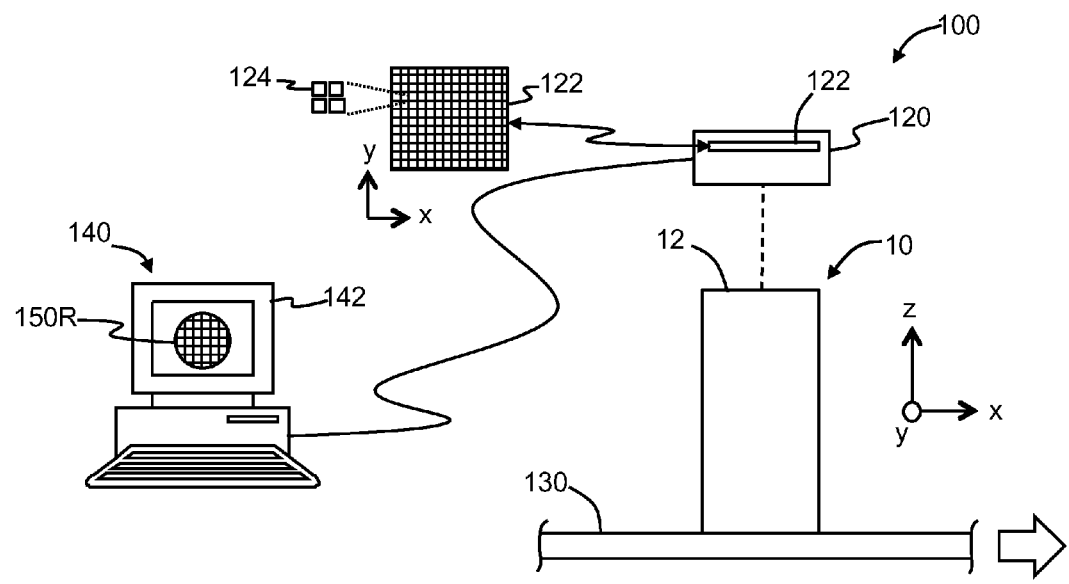
FIG. 4A is a schematic diagram that shows an image capture system having a digital camera arranged adjacent the front end of the extruded cellular ceramic article, which resides on a conveyor.

FIG. 4A is a schematic diagram that shows an image capture system 100 that comprises a digital camera 120 operably arranged adjacent front end 12 of ceramic article 10. The ceramic article 10 is supported by a conveyor 130 that conveys the ceramic article past digital camera 120. The digital camera 120 comprises an image sensor 122 having pixels 124. The digital camera 120 is shown operably (e.g., electrically) connected to a computer 140 that has a display 142. The digital camera 120 is configured to capture a (raw) digital image 150R of at least a portion of web array 18 at front end 12 of ceramic article 10. In an example, conveyor 130 can be a linear stage or a conveyor belt used in the manufacturing process to convey ceramic articles 10 from one location to another.

Figure 4B:
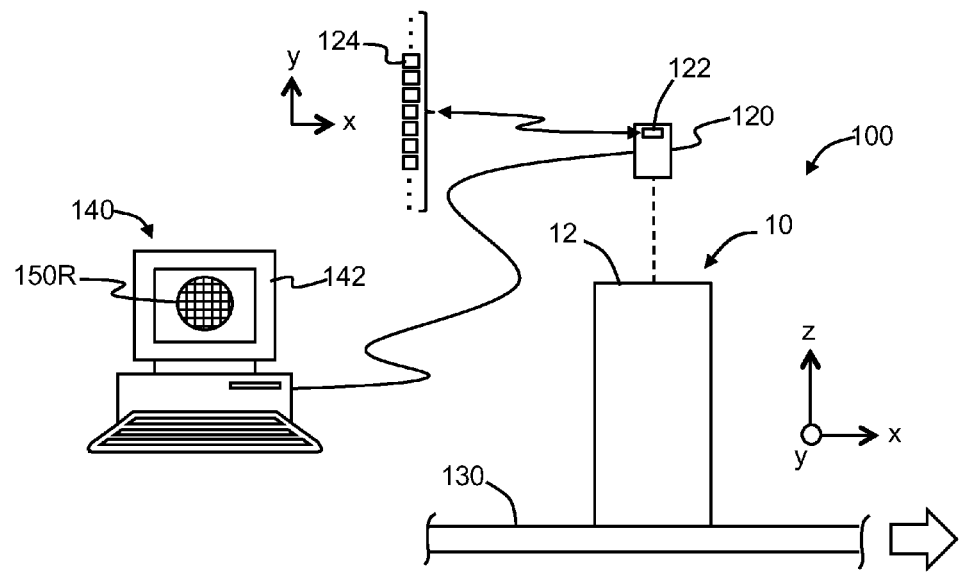
FIG. 4B is similar to FIG. 4A and illustrates an example image capture system wherein the digital camera comprises a linear sensor.

In an example illustrated in FIG. 4B, image sensor 122 is a linear image sensor or line-scan camera defined by a line of pixels 124 shown in the close-up inset as running in the y-direction. The linear image sensor 122 is used to capture a line image of front end 12 of ceramic article 10 as the ceramic article is conveyed past digital camera 120. In an example, linear image sensor 122 is used as a line scanner and is arranged immediately adjacent front end 12 of ceramic article 10 to capture a scanned digital image.

Figure 4C:
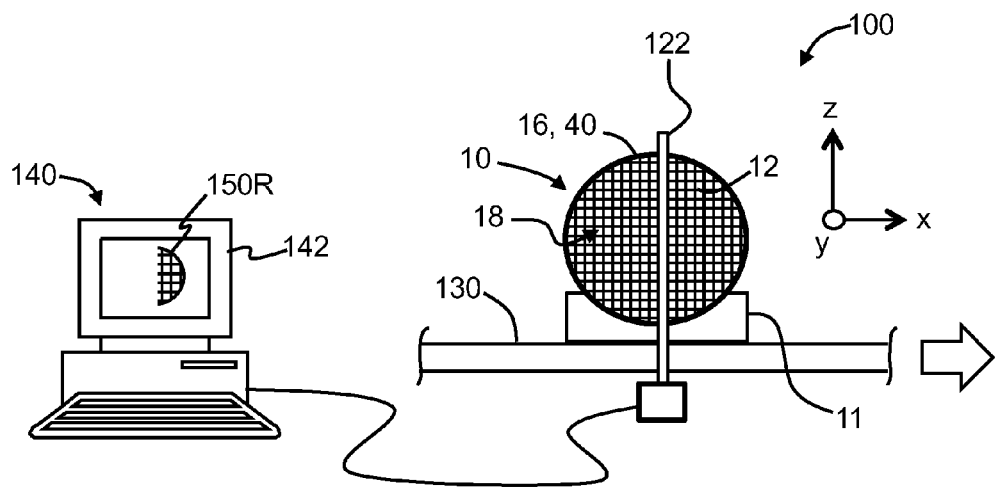
FIG. 4C is a close-up view of another example of an image capture system that uses a linear scanner and where the ceramic article is arranged horizontally.

FIG. 4C shows an example of image capture system 100 wherein ceramic article 10 is supported by a tray 11 so that central axis A1 of the ceramic article is horizontal (i.e., is in the y-direction). A linear image sensor 122 is arranged with its long axis in the z-direction and captures line images of front end 12 as conveyor 130 moves ceramic article 10 pass the linear image sensor.

Figure 4D:
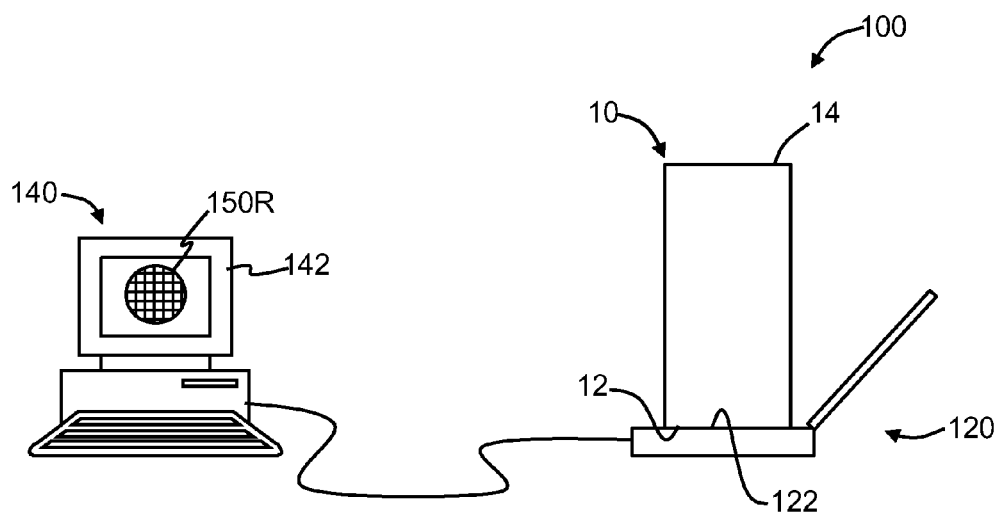
FIG. 4D illustrates an example of an image capture system wherein the image capture device is in the form of a conventional flatbed scanner.

FIG. 4D shows another example image capture system 100 wherein image capture device 120 has the form of a conventional flatbed image scanner. The ceramic article 10 can be placed directly atop scanning image sensor 122 to capture an image of front end 12 as shown. The ceramic article 10 can easily be flipped over to capture an image of back end 14 as well.

In an example, image capture system 100 comprises computer 140. The computer 140 can be used to stitch together line-scan images of web array 18 to form the larger 2D captured digital image 150R as well as perform other image processing. In an example, captured digital image 150R comprises the entire front end 12 of ceramic article 10 so that it comprises the entire web array 18. FIGS. 4A through 4C show captured digital image 150R being displayed on display 142 of computer 140, with captured digital image 150R of FIG. 4C being only partially completed since the image capture process is shown as being only partially completed.

Capturing an image of one end (e.g., front end 12) of ceramic article 10 is usually sufficient to perform the methods disclosed herein since the ceramic article is formed by extrusion and any defects tend be extrusion-related defects that are substantially consistent along the axial dimension of the ceramic article. In another example, the method comprises capturing images of both front and back ends 12 and 14 of ceramic article 10 and performing the methods described below to both captured images.

Once captured digital image 150R of front end 12 of ceramic article 10 is obtained, in an optional step the captured digital image can be processed using one or more processing steps to reduce noise.

The image capture system 100 is configured to have sufficient resolution to resolve defects that can substantially affect the structural integrity of ceramic article 10 being measured. For webs 30 having a nominal width of 4 mil, a suitable if not optimal resolution is 1200 dots per inch (dpi). This calculation is dominated by the detectability and confidence in calculating sheared or z-cells. The 1200 dpi resolution yields a minimal (non-sub pixel) calculation of a minimal angle of 0.6 degrees. This accuracy and precision can be increased by using sensors with resolutions larger than 1200 dpi such as 2400 dpi or 4800 dpi. The increased resolution results in larger image size, which causes an increase in cycle time due to data transfer protocols over communication links.

As noted above, once captured digital image 150R is acquired, it can be processed by image processing software (e.g., in computer 140) to identify critical aspects of the structure of cells 20, such as the cell center locations, center post locations, web array angle, open cell area and web array width and the web array edge locations. In an example, once these parameters are identified, they can be compared to the product specifications for the parameters to determine whether to reject or accept the measured ceramic article 10.

Detecting Cell and Web Array Defects

An aspect of the disclosure is a non-destructive method of detecting and measuring (e.g., characterizing) web array defects in ceramic article 10. One aspect of the method comprises using a cubic spline algorithm to find a high-resolution web-array representation, even in the presence of noise such as fillets and debris. Fillets and debris are commonly seen on both green and fired ceramic articles 10. It is highly advantageous to have a measurement method that is robust when such noise is present.

In an example, the method comprises locating cell center posts, which is a "first level" cell attribute that can be used to calculate "second level" attributes, such as web angles, web curvature, etc. As discussed below, a center post is defined by the intersection of four webs 30.

The method disclosed herein is capable of measuring the maximum curvature of each web 30. One of the limitations of the existing methods is that they can measure web curvature only in the middle of web 30 (i.e., midway between center posts). From a structural point of view, the maximum curvature point is the weakest web point, and it does not necessarily occur in the middle of web 30.

Prior art methods have difficulty detecting non-knitter web defects 30NK when web 30 is curved or bent. The methods disclosed herein can accurately detect non-knitter web defects 30NK on curvy or bent webs 30. A benefit of using cubic spline representation for each web 30 in web array 18 is that it provides a smooth contiguous trace of the web shape in the presence of debris, local web thickness deviations and gap-type defects such as non-knitter web defects 30NK. This allows more accurate and robust web array feature measurements to be performed.

Establish Cell Contours

Figure 5A:
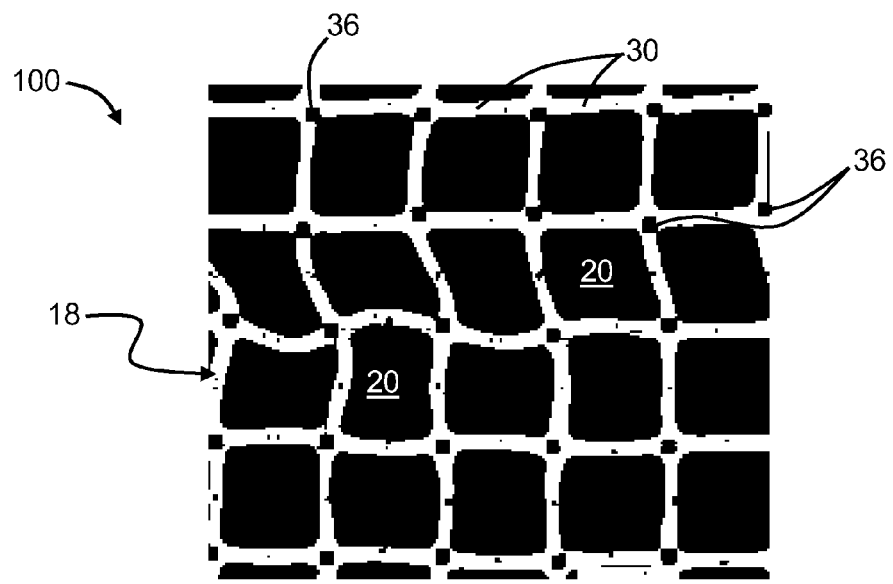
FIG. 5A is a close-up view of an example web array, showing the estimated locations of the central posts in the web array.
Figure 5B:
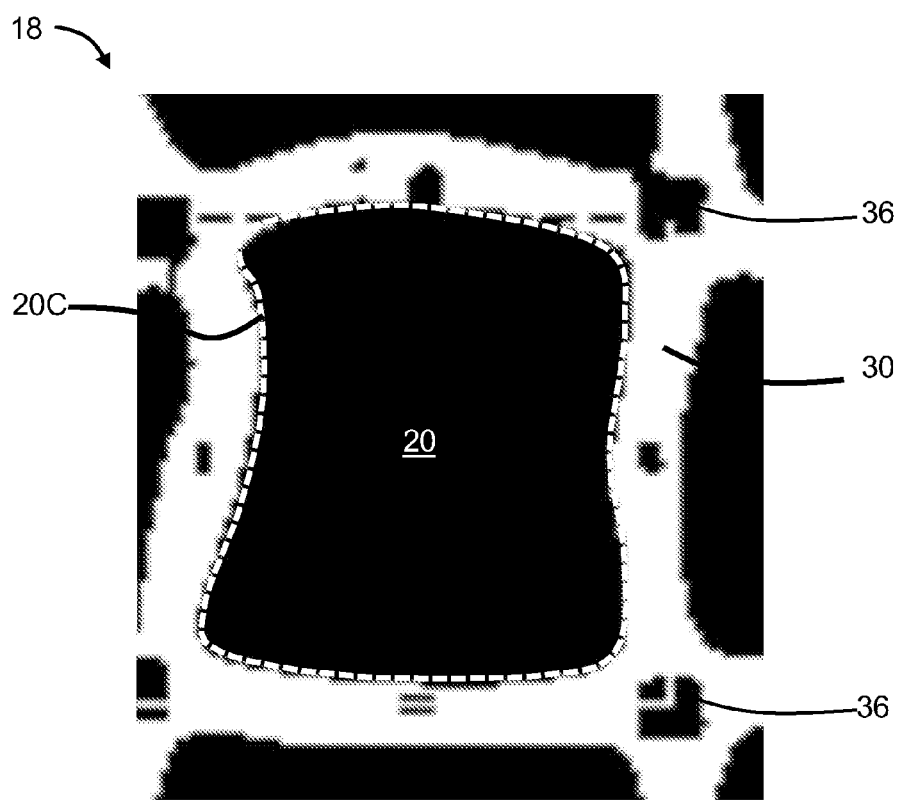
FIG. 5B is a close-up view of one of the cells in the example web array of FIG. 5A and illustrates an example of a cell contour.

An aspect of the method comprises determining the general shape of each cell 20 by establishing "cell contours" from captured digital image 150R. FIG. 5A is a close-up view of an example web array 18, while FIG. 5B is an even more close-up view centered on a single cell 20. A cell contour 20C is shown as the white dashed line and it represents the dark shape of cell 20 as comprising webs 30 that make up the cell. The white dashed-line cell contour 20C shown in FIG. 5B is shown as slightly smaller than the actual dark outline so that the cell contour can be more readily seen. In an example, web array 18 is considered to be made up of cell contours 20C and webs 30. As discussed above, web array 18 comprises center posts 36 defined by the intersection location of four webs 30.

The cell contours 20C can be identified in captured digital image 150R using for example an adaptive thresholding process that establishes a gray-scale intensity threshold to distinguish between the relatively bright-valued pixels associated with webs 30 and the relatively dark-valued pixels associated with cells 20. In an example, the thresholding process can comprise the use of a smoothing kernel and like image-processing techniques.

Figure 5C:
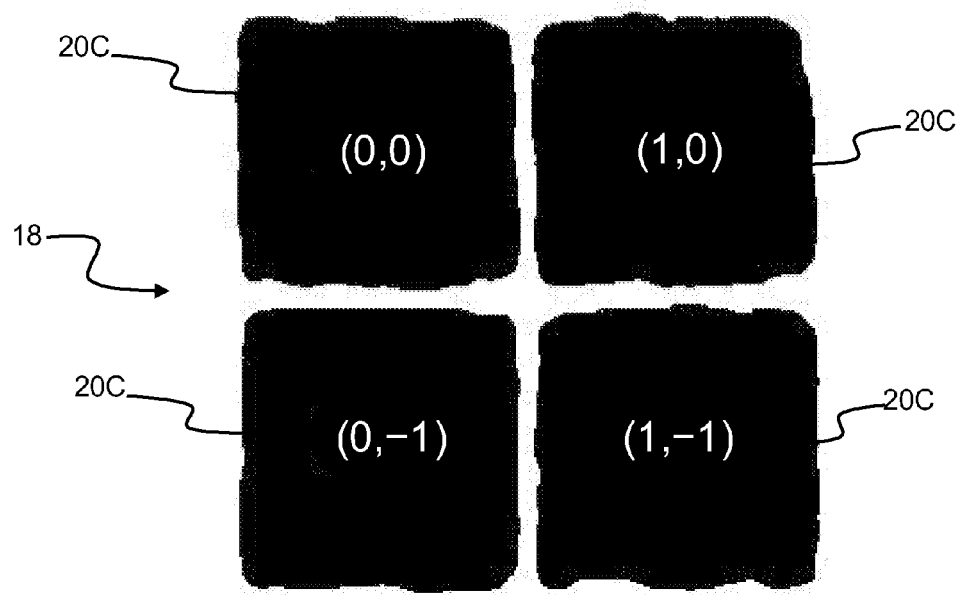
FIG. 5C is a close-up view of four cell contours with the cell locations identified using (i,j) coordinates.
Figure 5D:
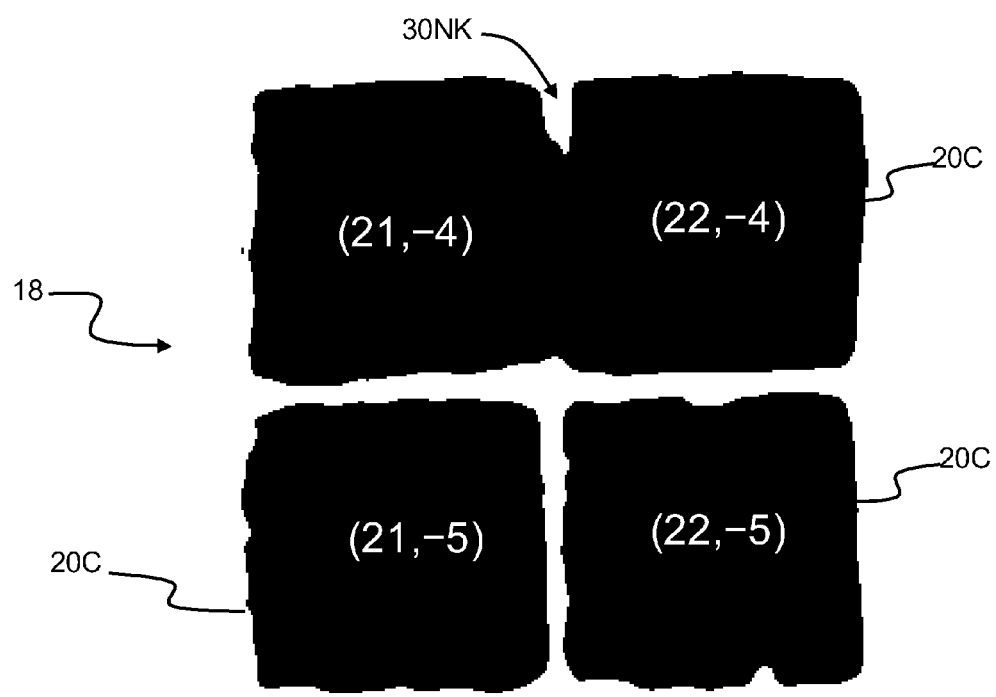
FIG. 5D is similar to FIG. 5C but shows an example of a cell contour that is not localized as a single cell because the cell contour encompasses two adjacent cells due to a non-knitter defect in the web between the two cells.

Generally, a given cell contour 20C can be directly associated with a given cell 20 and can thus be assigned an (i,j) grid location that matches up with the given cell location. FIG. 5C shows an example portion of web array 18 with four cell contours 20C with (i,j) grid locations (0,0), (1,0), (0,-1) and (1,-1). FIG. 5D is similar to FIG. 5C and shows an example portion of web array 18 with (i,j) grid locations (21,-4), (22,-4), (21,-5) and (22,-5), wherein only one cell contour 20C is associated the (i,j) grid locations (21,-4) and (22,-4). This is due to cell contour 20C not having a distinct one-cell shape due to a non-knitter web defect 30NK that results in two adjacent cell contours merging into a single larger cell contour.

Additionally, cell contours 20C can be produced by dark debris in skin 40 or by poor foreground segmentation. A bit-array contour map or "edge map" is used to mark all cell contour pixels 124 for cell contours 20C that are not assigned to a single cell 20. The cell contours 20C that can be assigned to a single cell 20 are not included in the edge map. The edge map is used to find a web array outline for cells 20 that do not have a pre-assigned contour.

Establish a High-Resolution Web Array Representation

Figure 6A:
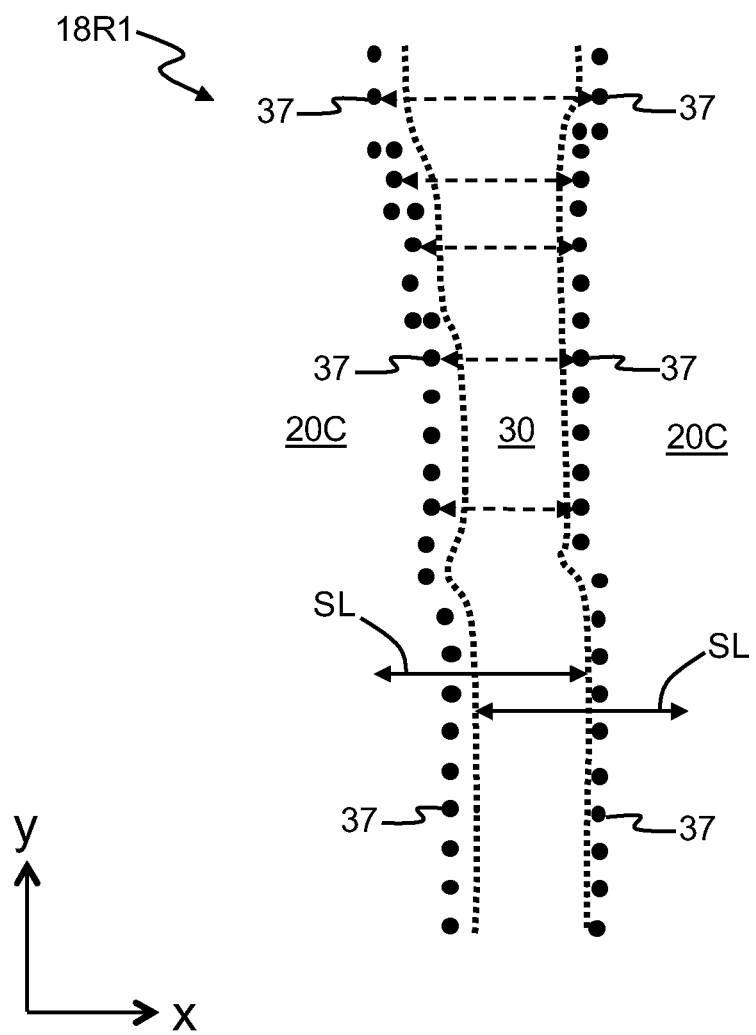
FIG. 6A shows a close-up view of a portion of two adjacent cell contours and the intervening web, and shows the pairing up of nearest edge locations at the same y-coordinate using the cell contours, and also shows the actual web edge locations as dashed lines, and also shows example search lines used to form a web array representation where the edge locations are established to sub-pixel resolution.

FIG. 6A shows a close-up view of a portion of two adjacent cell contours 20C and the intervening web 30 and depicts an initial web array representation 18R1 that does not have sub-pixel accuracy. The next step in the method involves establishing from initial web array representation 18R1 a high-resolution web array representation using cell contours 20C, including those in the edge map. Using the edge map and cell contours 20C on either side of a given web 30, the method determines estimated edge pair locations 37 that define the shape of web array 18 for a given web. Notice in FIG. 6A that the web edges in the edge map, which are defined by edge pair locations 37, are relatively rough, non-sub-pixel representations of the actual web array outline (shown as dashed lines), often with gross misalignments due to numerical truncations. Sub-pixel web-array edge localization is needed to extract accurate web contours to define a high-resolution web array representation.

FIG. 6A comprises search lines SL used to perform an intensity threshold process to arrive at a high-resolution web array representation. In an example, an optimum local intensity threshold T that can be used to separate the brighter webs 30 from the darker background of cells 20 is approximated. In an example, this is carried out by first creating an intensity histogram for all pixels 124 within a rectangular region of interest that covers web 30 of interest and cells 20 on either side of the web.

The process can be described mathematically as follows. Let $\sigma_W^2$ and $\sigma_B^2$ denote the within-class and between-class variances respectively for dark and bright pixel intensities. The idea here is to maximize between-class variance $\sigma_B^2$ by choosing the threshold T. Now, $$\sigma_w^2(T) = n_1(T)\sigma_1^2(T) + n_2(T)\sigma_2^2(T),$$

where $$n_1(T) = \sum_{i=0}^{T-1} P(i),$$

$$n_2(T) = \sum_{i=T}^{255} P(i),$$

where $\sigma_1^2(T)$ is the background pixel variance below T, $\sigma_2^2(T)$ is the foreground pixel variance above T, and $P(i) = |i|/N$, where N is the ROI pixel area and $|i|$ is the number of pixels with intensity i.

The overall variance $\sigma^2$ is the sum of between-class variance $\sigma_B^2(T)$ and within-class variance $\sigma_W^2(T)$:

$$\sigma^2(T) = \sigma_B^2(T) + \sigma_W^2(T)$$

$$\sigma_B^2(T) = \sigma^2(T) - \sigma_W^2(T)$$

$$\sigma_B^2(T) = \sigma^2(T) - (n_1(T)\sigma_1^2(T) + n_2(T)\sigma_2^2(T)),$$

After some simplification, we get:

$$\sigma_B^2(T) = \left( \frac{(n_1(T) - \mu_1)^2}{n_1(T)(1 - n_1(T))} \right)$$

where $\mu_1 = \sum_{i=0}^{T-1} iP(i)$ is the average pixel intensity below T. The optimum threshold T is found when the equation above is maximized, i.e., $$\max_T \left( \frac{(n_1(T) - \mu_1)^2}{n_1(T)(1 - n_1(T))} \right)$$

Once the optimum local intensity threshold T is determined, then rows (or columns) of pixels 124 are scanned along search lines SL, i.e., in the direction orthogonal to the web orientation, to find the sub-pixel boundaries that separate background (cell) and foreground (web) regions along the entire web length.

As shown in FIG. 6A, search lines SL start in the background, say five pixels from the estimated edge location on that side of web 30 to the estimated edge location on the opposite side of the web. The point of this step is to find the low to high intensity transition that crosses the threshold T.

If p is the pixel location with intensity $I_p$ above or equal to T and a previous pixel in the search direction has intensity $I_{p-1}$ less than T, then the sub-pixel location $\tilde{p}$ is equated to:

$$\tilde{p} = p - \frac{I_p - T}{[I_p - I_{p-1}]} \text{ for forward scan direction or}$$

$$\tilde{p} = p + \frac{I_p - T}{[I_p - I_{p-1}]} \text{ for backward scan direction.}$$

Figure 6B:
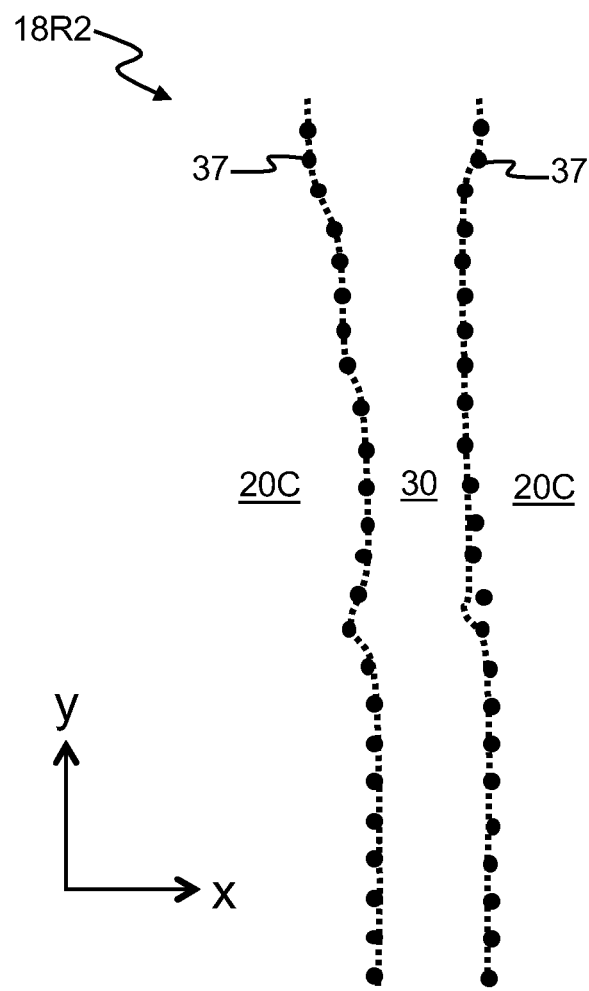
FIG. 6B is similar to FIG. 6A and shows a high-resolution (i.e., sub-pixel) web array representation along with updated pair locations.

FIG. 6B is similar to FIG. 6A and shows a high-resolution (i.e., sub-pixel) web array representation 18R2 along with updated pair locations 37. If more than one pair location 37 is found along search line SL (such as caused by debris), then the method picks the sub-pixel edge pair locations nearest to the web center.

Filter the High-Resolution Web Array Representation to Remove Debris

Figure 7:
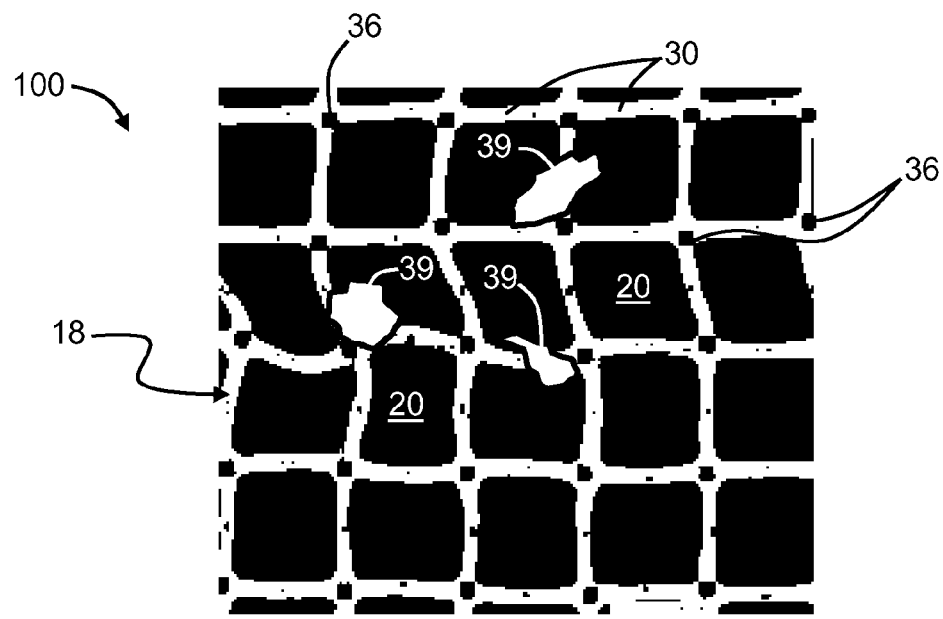
FIG. 7 is similar to FIG. 5A and shows an example portion of a web array that comprises web array debris.

In some cases, there may be debris present on web array 18 that can adversely affect the determination of high-resolution web array representation 18R2. Thus, in an example, the web array edge points in high-resolution web array representation 18R2 are optionally filtered to remove any such points that are likely to represent debris. FIG. 7 is similar to FIG. 5A and shows an example portion of web array 18 that comprises web array debris 39. The debris 39 can cause unwanted deformation in the cubic spline representation of web array 18 as determined in subsequent steps and so is preferably removed in order to achieve the best defect detection and measurement results.

An example method of filtering debris 39 from high-resolution web array representation 18R2 comprises the following five main steps:

1) Fit a 3rd order polynomial, $Ax^3+Bx^2+Cx+D$, through the midpoint between edge pairs.
2) Calculate $\sigma_A$, the error standard deviation between nominal web array thickness and actual distance (i.e., thickness) between edge pairs.
3) Calculate $\sigma_B$, the standard deviation of actual distance (i.e., thickness) between edge pairs and $\mu_B$, the average edge pair distance.
4) Remove edge pairs if one of the following criteria is met:
   a. If $\sigma_A$ is less than half nominal web thickness, then remove edge pairs with distance greater than half nominal web array thickness. This is the case when the web array thickness is close to nominal value with minimal web array debris.
   b. If $\sigma_B$ is greater than 1 and polynomial coefficients A and B are greater than 0.0001 and 0.005 respectively, then remove edge pairs when the error between their distance apart and $\mu_B$ is more than $\sigma_B$. If the higher order polynomial coefficients are smaller, then we have a straight web array where the debris if any does not affect web array spline profile, e.g., in some swollen web arrays with outlines that bend outward in opposite directions by almost the same amount as evident in FIG. 9.
5) Reintroduce edge pairs that curve in opposite directions (i.e., do not affect web array direction) or in the same direction (actual curve not debris) by almost the same amount with respect to neighboring edge pair that are not eradicated in previous step. In both cases, the error must be less than two pixels.

Determine Knot Locations to be Used for Cubic Spline Fit

Figure 8:
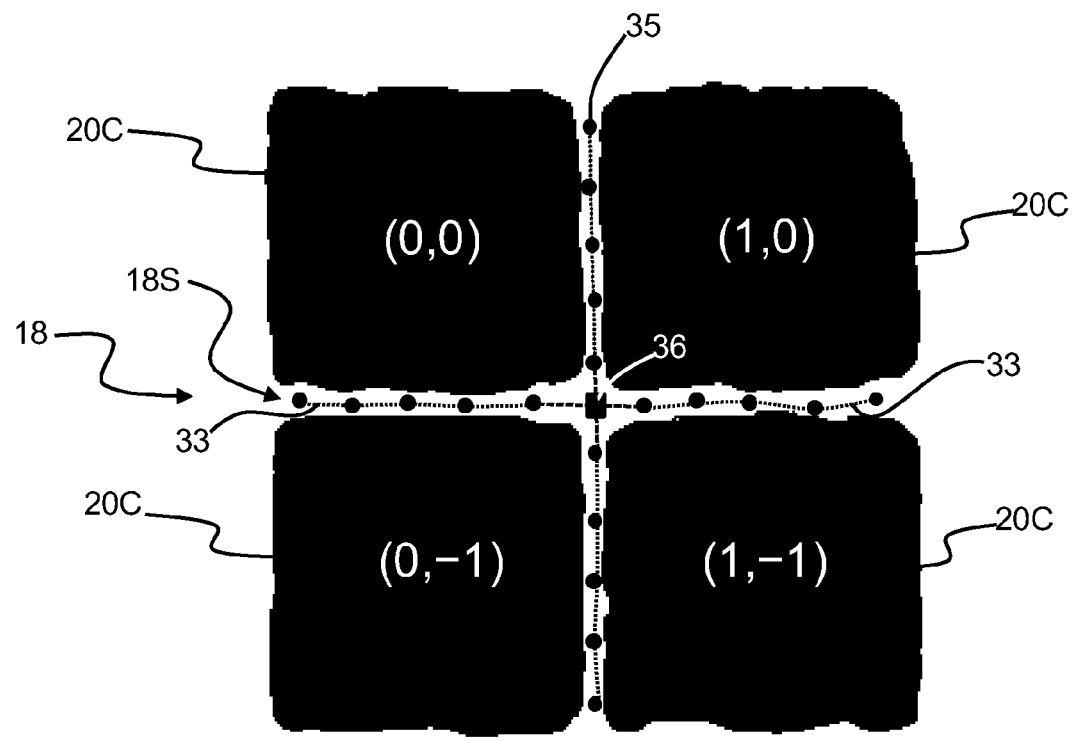
FIG. 8 is similar to FIG. 5C and shows example knots used to form the piecewise cubic spline sections that define a sub-pixel web array representation.

Once the high-resolution web array representation 18R2 is established and optionally filtered for debris, then the locations to be used as the terminal endpoints for a piecewise cubic spline fit to form a precise "skeleton" representation of the entire web array 18 are determined. These are referred to as "knot locations" or just "knots" and can be calculated by dividing a given web 30 in the existing sub-pixel-resolution web array representation into segments that are a certain number of pixels 124 long (e.g., between 5 and 7 pixels) and then averaging the filtered edge pair midpoints within each segment into a single knot location. FIG. 8 is similar to FIG. 5C and shows example locations of knots 35.

Connect the Knot Locations Using a Cubic Spline Fit

Once knots 35 are determined, the next step in the method comprises using a cubic spline fit to connect the knots. This comprises calculating a series of third-order polynomials that connects adjacent pairs of knots 35 smoothly. A cubic polynomial is given by:

$$f(x)=ax^3+bx^2+cx+d=y$$

If there are N knots, then $(x_i, y_i)$ for $0 \leq i \leq N-1$, denotes the i-th knot location. The i-th cubic polynomial or spline segment denoted by $S_i$ that connects knot points $(x_i, y_i)$ and $(x_{i+1}, y_{i+1})$ is equated to $$S_i(x)=a_i(x-x_i)^3+b_i(x-x_i)^2+c_i(x-x_i)+d_i$$

$$S'_i(x)=3a_i(x-x_i)^2+2b_i(x-x_i)+c_i$$

$$S''_i(x)=6a_i(x-x_i)+2b_i$$

Where $S'_i(x)$ and $S''_i(x)$ are the first and second derivatives of $S_i$ respectively. The goal here is to determine the polynomial coefficients, $a_i$, $b_i$, $c_i$ and $d_i$ each spline $S_i$ to satisfy the following criteria:

$$S_i(x)=S_{i-1}(x)$$

$$S'_i(x)=S'_{i-1}(x)$$

$$S''_i(x)=S''_{i-1}(x)$$

The above constraints ensure that the resultant set of piecewise cubic splines are joined smoothly together. The coefficients are determined as follows:

$$a_i = \frac{(m_{i+1} - m_i)}{6(x_{i+1} - x_i)}$$

$$b_i = \frac{m_{i+1}}{2}$$

$$c_i = \frac{(y_{i+1} - y_i)}{(x_{i+1} - x_i)} - \frac{(x_{i+1} - x_i)(m_{i+1} - 2m_i)}{6}$$

$$d_i = y_i$$

where $m_i$ is calculated by solving the matrix equation:

$$\begin{bmatrix} 2(x_2-x_0) & x_2-x_1 & 0 & 0 & \cdots & \cdots & \cdots & \cdots & 0 \\ x_2-x_1 & 2(x_0-x_1) & x_2-x_3 & 0 & & & & & \vdots \\ 0 & x_3-x_2 & 2(x_4-x_2) & x_4-x_3 & & & & & \vdots \\ \vdots & & & \ddots & & & & & \vdots \\ \vdots & & & & x_{N-4}-x_{N-5} & 2(x_{N-3}-x_{N-5}) & x_{N-1}-x_{N-4} & 0 & \\ \vdots & & & & 0 & x_{N3}-x_{N4} & 2(x_{N-2}-x_{N-4}) & x_{N-1}-x_{N-2} & \\ 0 & \cdots & \cdots & \cdots & \cdots & 0 & 0 & x_{N-1}-x_{N-2} & 2(x_{N-1}-x_{N-2}) \end{bmatrix} \begin{bmatrix} m_1 \\ m_2 \\ m_3 \\ \vdots \\ m_{N-4} \\ m_{N-3} \\ m_{N-2} \end{bmatrix} =$$

$$6\begin{bmatrix} \frac{(y_2-y_1)}{(x_2-x_1)} - \frac{(y_1-y_0)}{(x_1-x_0)} \\ \frac{(y_3-y_2)}{(x_3-x_2)} - \frac{(y_2-y_1)}{(x_2-x_1)} \\ \frac{(y_4-y_3)}{(x_4-x_3)} - \frac{(y_3-y_2)}{(x_3-x_2)} \\ \vdots \\ \frac{(y_{N-3}-y_{N-4})}{(x_{N-3}-x_{N-4})} - \frac{(y_{N-4}-y_{N-5})}{(x_{N-4}-x_{N-5})} \\ \frac{(y_{N-2}-y_{N-3})}{(x_{N-2}-x_{N-3})} - \frac{(y_{N-3}-y_{N-4})}{(x_{N-3}-x_{N-4})} \\ \frac{(y_{N-1}-y_{N-2})}{(x_{N-1}-x_{N-2})} - \frac{(y_{N-1}-y_{N-2})}{(x_{N-1}-x_{N-2})} \end{bmatrix}$$

Note that the first and last terms, $m_0$ and $m_{N-1}$, are both zero and do not appear on the preceding equation. To determine the y (or x) location given an x (or a y) location along a horizontal (or vertical) web array 18 using a cubic spline, the spline interval the input value x (or y) belongs to needs to be determined in order to pick the correct spline needed to calculate the corresponding output value. For example, in the case of horizontal web array 18, s, that connects knot $(x_i, y_i)$ and knot $(x_{i+1}, y_{i+1})$ is selected if the input location x is such that $x_i \leq x \leq x_{i+1}$ ($y_i \leq y \leq y_{i+1}$).

FIG. 8 shows an example of cubic spline segments 33 (dotted lines) between knots 35 to form a portion of a web array skeleton 18S. The portion of web array skeleton 18S that traverses a given web 30 is referred to as a "web skeleton."

Determine Center Post Locations

Figure 9:
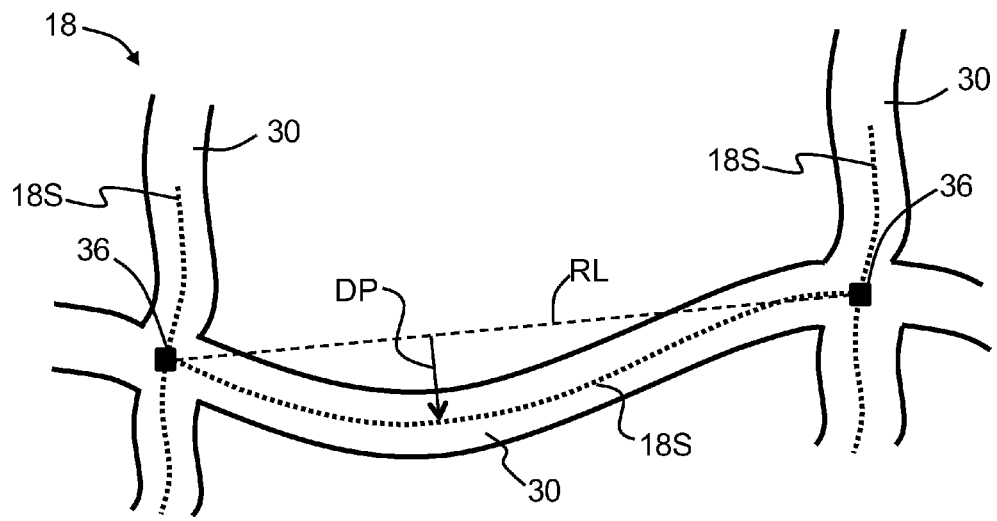
FIG. 9 is a close-up view of a section of a web array showing a curved web, associated center posts, and a web array representation formed by the connected cubic spline sections.

FIG. 9 is a close-up view of a portion of web array 18 showing a curved web 30 and a portion of web array skeleton 18S, including a portion that traverses the curved web between adjacent center posts 36. In the case illustrated in FIG. 9, where there are four unbroken webs 30 that meet to form center post 36, the location of the center post is calculated using numerical analysis by determining the intersection point of orthogonal sections of web array skeleton 18S that cross the web junction.

However, there can be cases where one or two web arrays 18 are broken near center post 36. As long as there is at least a pair of orthogonal webs 30, then the location of the associated center post 36 can be calculated. Broken webs 30 generally do not pose a problem in determining the center post locations as long as the broken webs lead toward the center post location. This is especially true in cases where the web breakage is found far away from center post 36. Nonetheless, for webs 30 that are broken and misaligned, such webs are found and then excluded when determining the locations of center posts 36. Otherwise, the calculated center post location can be steered away from its true location.

The location of center post 36 is most affected by the four nearest knots 35 in each direction, i.e., the two knots on either side of the junction of the four webs 30. The remaining knots 35 farther from the junction of webs 30 are used for other measurements, such as web curvature and non-knitter defect detection. Thus, in an example, the intensity values along cubic spline segments 33 near center post 36 are examined to identify drops in intensity relative to the local foreground intensity threshold T to identify breaks in one or more of webs 30.

This procedure is carried out to locations less than 1.5 times the nominal web thickness from the estimated center post location. In cases where breaks are found in one of webs 30, the calculation for the location of center post 36 does not use knots 35 on the broken web and uses the remaining knots and cubic spline segments 33 of web array skeleton 18S.

Determine Maximum Web Curvatures

Once all center posts 36 and cubic spline segments 33 have been determined, the entire web array skeleton 18S is defined and can be used to determine the maximum curvature for webs 30. With continuing reference to FIG. 9, determining the maximum web curvature can be done by following web array skeleton 18S to find the spot with the maximum perpendicular distance DP from a reference line RL that connects center posts 36 on either ends of the given web 30. The determined maximum web curvature can then be compared to a maximum allowable web curvature to ascertain whether ceramic article 10 is conforming to the product specifications.

For an edge cell 20 with only one center post 36, the missing end point of reference line RL is assigned to the midpoint of filtered web array outline edge pair that is farthest from the corresponding center post. Note that the maximum curvature need not and often does not occur at the midpoint between center posts 36.

Traverse Length of Web to Find Non-Knitter Defects

Figure 10:
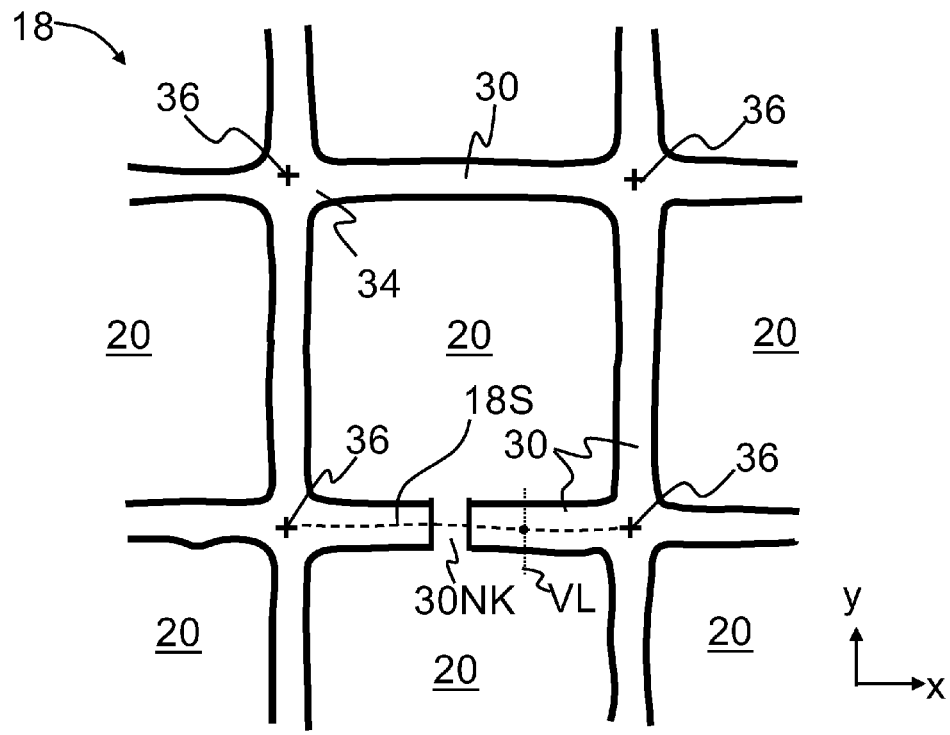
FIG. 10 is a close-up view of an example portion of a web array wherein the bottom web comprises a non-knitter defect.

The next step of the method comprises locating any non-knitter web defects 30NK in web array 18. This is accomplished by using web array skeleton 18S to traverse the length of webs 30, as shown in FIG. 10. Following web array skeleton 18S eliminates the problem of tracking into the background represented by cell contours 20C, which can happen when tracking along just two line segments that connect center posts 36 and a mid-web location.

The method thus comprises calculating the intensity and contrast profiles of all webs 30 by following web array skeleton 18S. An intensity threshold $T_M$ is then applied to identify non-knitter web defects 30NK. This threshold $T_M$ is referred to below as "the non-knitter intensity threshold." Just like the maximum web array curvature measurement mentioned above, the midpoint of the farthest web array outline edge pair is used to replace a missing center post 36 for an edge cell 20.

In an example, following web array skeleton 18S need not be performed along a one-pixel-thick line. Rather, web array skeleton 18S can comprise at each point along its length a window sized to the nominal web array thickness. Then, the brightest intensity within the window is determined and used as the intensity value for the corresponding point along web array skeleton 18S.

This step of the method can be accomplished as follows. Let $I_k=\{i_1, i_2, i_3, \ldots, i_{N-1}, i_N\}$ denote the intensity profile of the k-th web with a length of N pixels. The corresponding N long contrast profile for $I_k$ is $\Delta_k=\{i_2-i_1, i_3-i_2, \ldots, i_N-i_{N-1}\}$. Next, we collect the set of minimum intensities found in each web intensity profile as $M=\{\min_i(I_1), \min_i(I_2), \min_i(I_3), \ldots\}$. If $\mu_M$ and $\sigma_M$ are the mean and standard deviation calculated for M respectively, then the non-knit intensity threshold is determined as:

$$T_M = \max\left((\mu_M - 4.5\sigma_M), \left(\frac{\mu_M}{1.35}\right)\right)$$

Any intensities $I_k$ with a value less than $T_M$ are deemed to represent non-knitter web defect 30NK. The method comprises scanning the intensity profile ($I_k$) of each web 30 to find the largest segment of contiguous locations with intensity values lower than the non-knit intensity threshold $T_M$. If one of the contrast values ($\Delta_k$) near the ends of a segment is greater than a certain amount (e.g., 20), then a potential non-knitter web defect 30NK is found.

Non-Knitter Detection Using Intensity and Contrast

Figure 11:
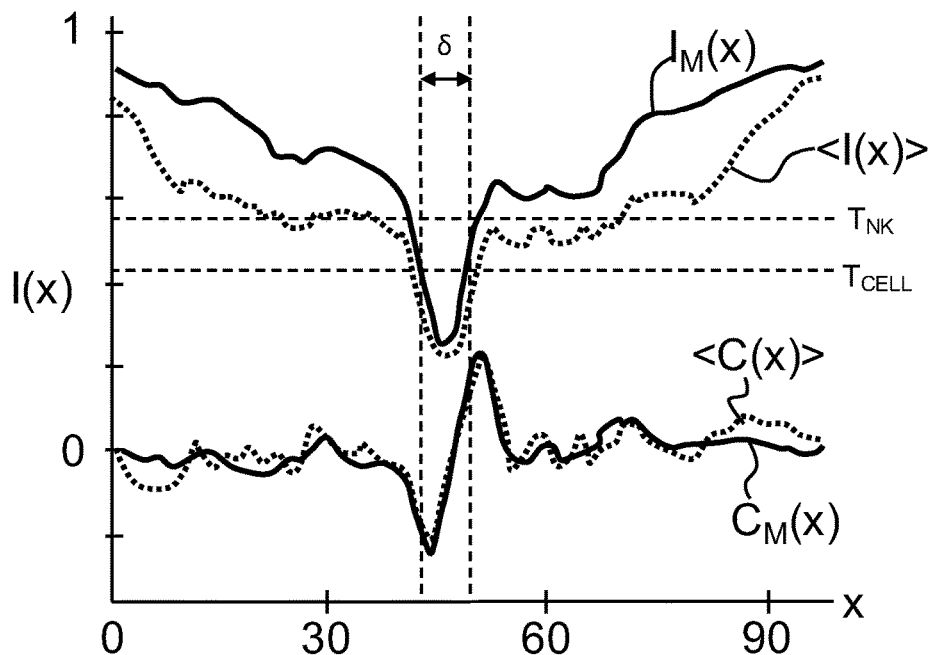
FIG. 11 plots the intensity I(x) (normalized units) versus distance x (relative units) and shows the mean and maximum intensity profiles $<I(x)>$ and $I_M(x)$ and mean and maximum contrast profiles $<C(x)>$ and $C_M(x)$ for the bottom web that includes the non-knitter defect, illustrating how an intensity threshold process can be employed to locate and determine a size of a non-knitter defect.

As discussed above, FIG. 10 is a close-up view of an example portion of web array 18 wherein the bottom web 30 includes a non-knitter web defect 30NK. FIG. 11 plots the intensity I(x) (normalized units) versus distance x (relative units) and shows the mean and maximum intensity profiles <I(x)> and $I_M(x)$, and the mean and maximum contrast profiles <C(x)> and $C_M(x)$ for the bottom web 30 that includes non-knitter web defect 30NK.

The mean and maximum intensity profiles <I(x)> and $I_M(x)$ are determined by examining the web array intensities between opposite sides of web 30 along web array skeleton 18S. The maximum intensity profile $I_M(x)$ for the bottom (right) web 30 is the brightest pixel intensity found along the vertical (horizontal) scan line connecting opposite web edge locations. The mean intensity profile <I(x)> for the bottom (right) web 30 is the average of the pixel values taken along the vertical (horizontal) scan line connecting opposite web edge locations. For example, for the horizontal section of web array skeleton 18S shown in FIG. 10, at a given point P, intensity values along vertical line VL through point P are reviewed and the maximum value is selected for $I_M(x=p)$ and the average value is selected for <I(x=p)>.

The contrast profile C(x) is calculated from either the maximum or mean intensity profile $I_M(x)$ or <I(x)>. The contrast C(x) is calculated using the maximum intensity difference found between the pixel intensity at a given location x and a number N of previous pixel locations along the given intensity profile used. The number N can be between 3 and 8, with N=4 being an exemplary value.

In an example, the local web array gap (i.e., non-knitter) intensity threshold is determined as the weighted sum of the local cell foreground intensity threshold $T_{Cell}$ and the global web array foreground intensity threshold $T_{NK}$. The local cell foreground threshold is the automatic threshold based on between-class variance maximization used for sub-pixel web array segmentation. In an example, the final cell web array gap intensity threshold is calculated as:

$T_{WG}=0.8T_{Cell}+0.2T_{NK}$

Figure 12:
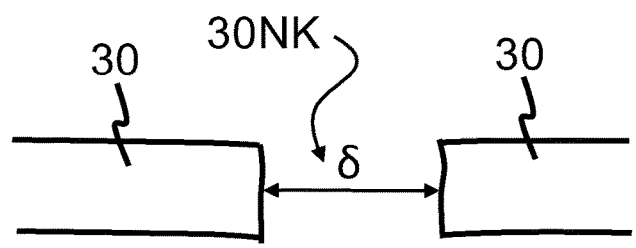
FIG. 12 is a close-up view of the non-knitter defect shown in FIG. 10, schematically illustrating the size 6 of the non-knitter defect in the web as illustrated in the plot of FIG. 11.
Figure 12:
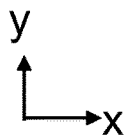

Any segment along the maximum or mean intensity profiles $I_M(x)$ and <I(x)> with intensity values below $T_{WG}$ is deemed a web array gap or non-knitter web defect 30NK if the absolute contrast values at the terminal segment location are also greater than a predefined contrast threshold, which in an example is 20. The size of the web array gap or non-knitter web defect 30NK is shown as δ in FIG. 11 and in the close-up view of FIG. 12.

Detecting Nodules and Kinked Webs

To detect nodules and kinked webs 30, the methods disclosed herein can comprise performing a split and merge polygonal approximation that reduces the web edges to poly-line representations connecting high curvature points along the web contour.

Figure 13:
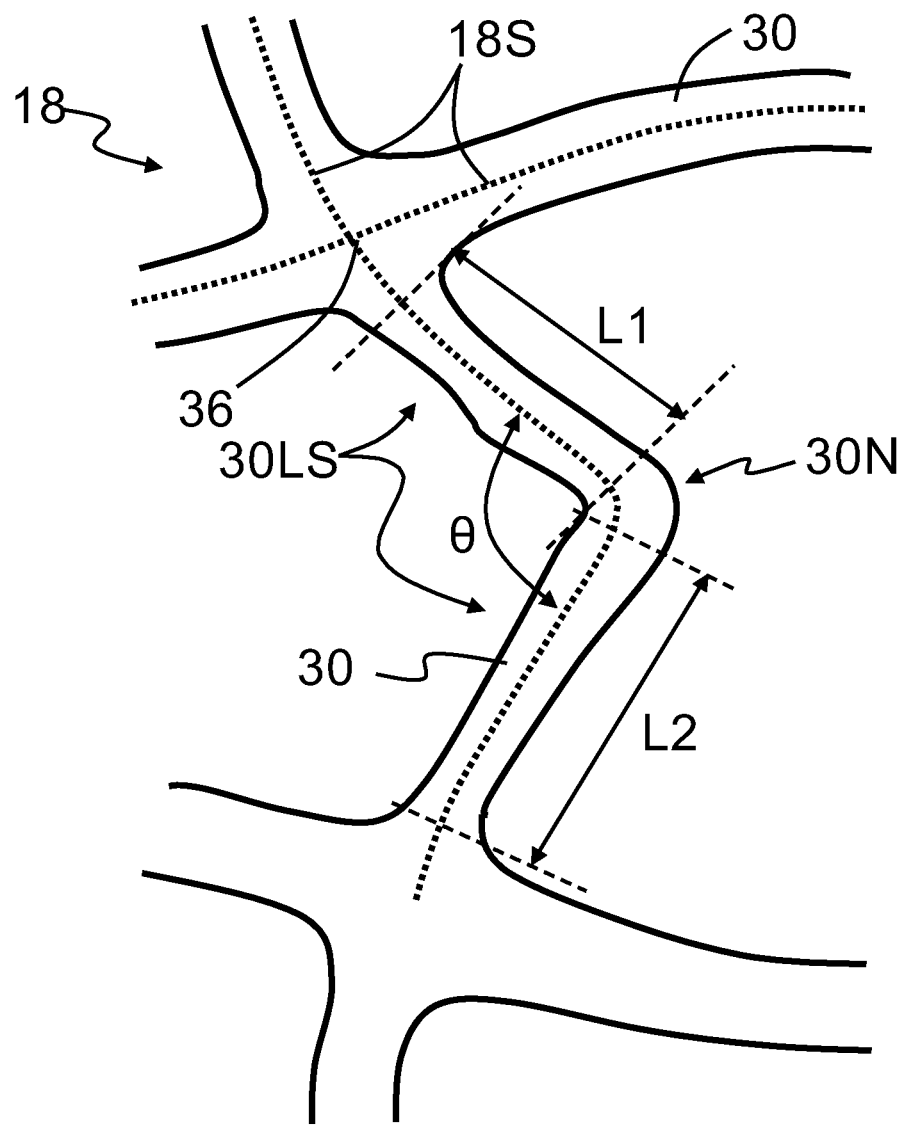
FIG. 13 is a close-up view of an example web array that shows a nodule type of web defect.

FIG. 13 is a close-up view of an example web array 18 that shows a bump or nodule 30N formed by one of the webs 30. The nodule 30N is described by two linear segments 30LS of web 30 having lengths L1 and L2 and that form an angle θ. In an example, nodule 30N has tolerances of angle θ≤110°, and both lengths L1 and L2 are greater than ⅓ of the length of web 30 for the nodule to pass inspection. FIG. 13 also shows a portion of web array skeleton 18S.

Figure 14A:
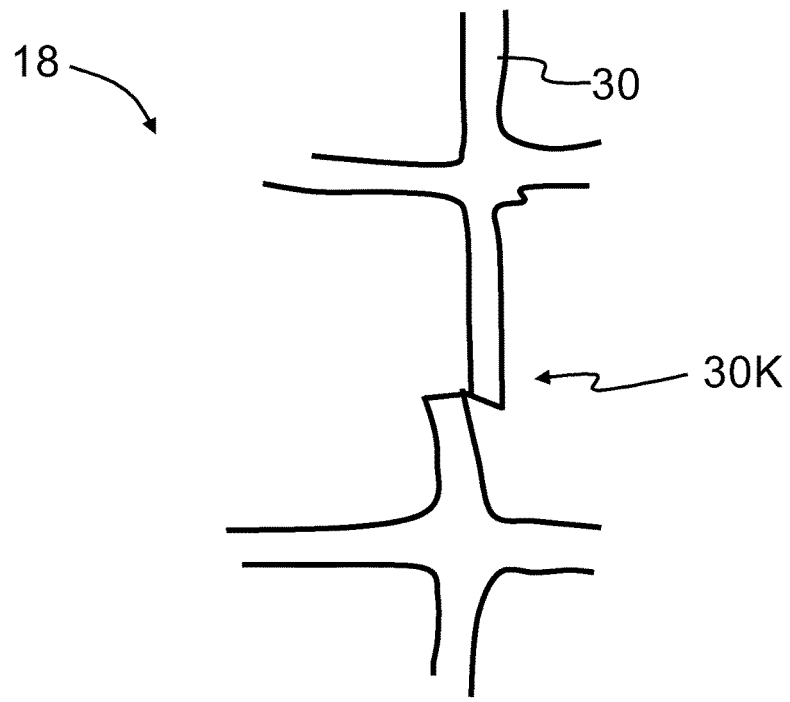
FIGS. 14A and 14B are close-up views of an example web array that illustrate a kink defect in one of the webs.
Figure 14B:
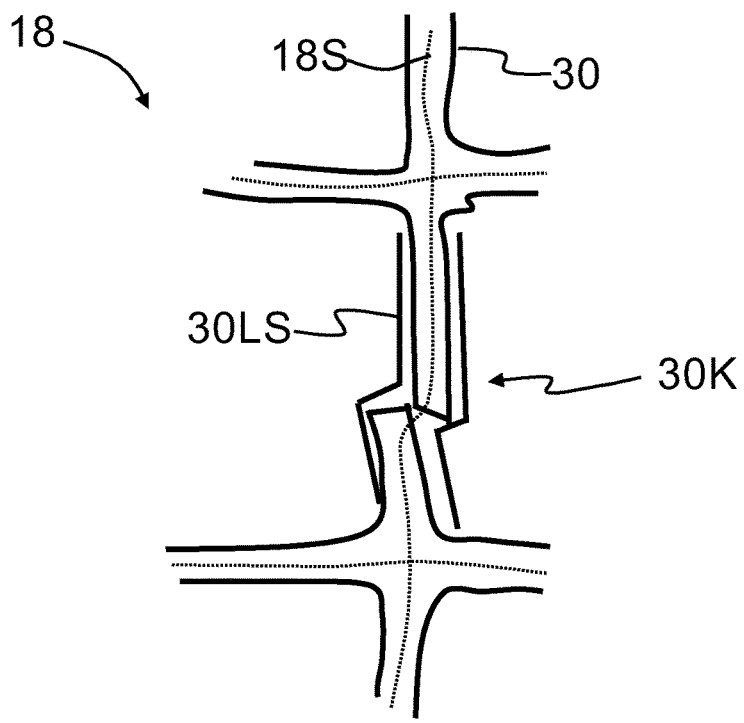

FIGS. 14A and 14B are close-up views of an example web array 18 that shows one of the webs 30 having a break or "kink" defect 30K. Despite the small gap in web 30 formed by kink defect 30K, the intensity and contrast profiles I(x) and C(x) do not capture the darker gap segment. This is because the intensity profiles orthogonal to web array skeleton 18S are derived from simple horizontal (vertical) scan lines along the web array skeleton for the right (bottom) web 30. In this case, the web array defect is detected as a kink defect 30K.

Figure 14C:
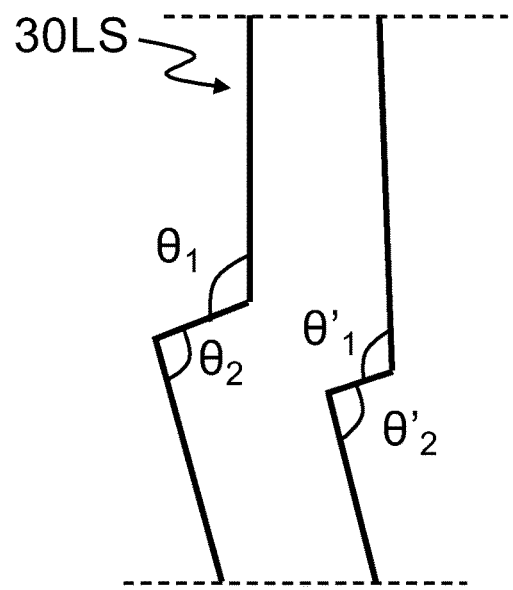
FIGS. 14C and 14D show the line segments used in FIGS. 14A and 14B to define the shape of the kinked web and respectively show angles and lengths that are used in one example to characterize the kink defect.
Figure 14D:
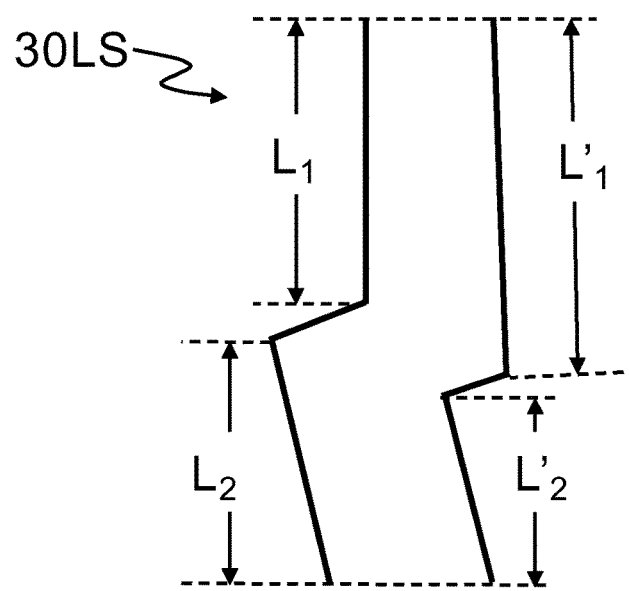

FIGS. 14C and 14D are close-up views of line segments 30LS similar to those discussed above in connection with FIG. 13 and that follow the outline of web 30 that includes kink defect 30K. In this case, the method uses line segments 30LS to find the adjacent high-curvature vertices separated by less than twice the nominal web array thickness with opposite signed angles less than 155°, i.e., sign($\theta_1$)≠sign($\theta_2$), |$\theta_1$| and |$\theta_1$|<155° (FIG. 14C). Additionally, in an example, lengths L1, L2 of line segments 30LS must be longer than one-quarter the nominal web array length (FIG. 14D).

The same criteria is applied to the opposite web edge contour for lengths L'1 and L'2, and all the vertices on both edge contours must be within twice the nominal web array thickness. Also, the sign of $\theta_1$ and $\theta'_1$ must be identical; likewise for the sign of $\theta_2$ and $\theta'_2$.

Detecting Skin Defects and Measuring Skin Thickness

An aspect of the methods disclosed herein comprises detecting skin defects and measuring the skin thickness of skin 40. These methods comprise the steps of obtaining the skin contour and web array representations as employed above. The original skin contour resolution is then enhanced to improve accuracy. Next, a convex hull and a polygonal approximation of the enhanced skin contour are calculated. Detection of fissure defects 40F is then preferably performed to avoid being misled in interpreting the type of surface defect or feature present in skin 40. Defects in the skin in the form of surface shape deviations can then be determined. The skin thickness can also be determined.

Figure 15:
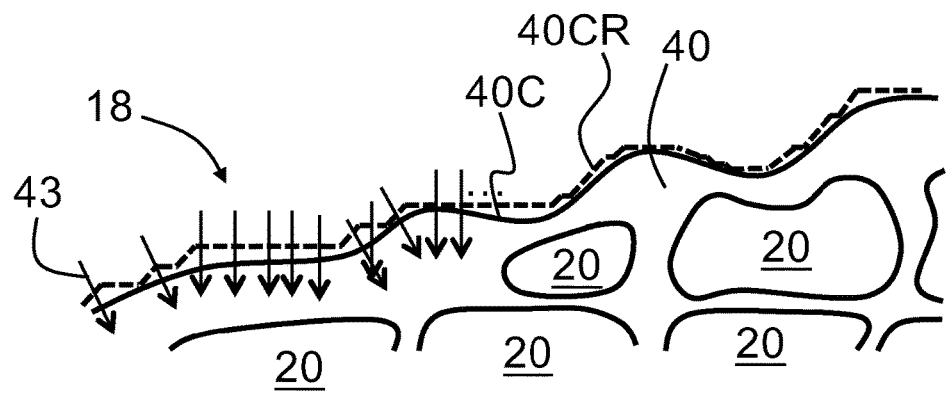
FIG. 15 is a close-up view of a portion of the web array and skin, showing how the initial skin representation does not have sub-pixel resolution.

FIG. 15 is a close-up view of an example representation 40CR of an original measured portion of skin contour 40C. The example skin contour representation 40CR is not sub-pixel accurate and can lead to errors. To obtain sub-pixel accuracy and tighter representation for skin contour 40C, sub-pixel edge detection is performed on orthogonal projections 43 at every estimated skin location along the original skin contour. The same auto-threshold technique employed in the cell and web array inspection methods is used to distinguish foreground and background regions, with the exception that here an auto-threshold to the entire web array 18 and skin area is applied.

In short, we would like to maximize between-class variance $\sigma_B^2$ by choosing threshold T such that, $$\sigma_B^2(T) = \left( \frac{(n_1(T) - \mu_1)^2}{n_1(T)(1 - n_1(T))} \right)$$

is maximum, where $$n_1(T) = \sum_{i=0}^{T-1} P(i),$$

$$\mu_1 = \sum_{i=0}^{T-1} iP(i),$$

where $P(i)=|i|/N$, with N being the region-of-interest pixel area and $|i|$ being the number of pixels with intensity i. If p is the pixel location with intensity $I_p$ above or equal to T and the previous pixel in the search direction has intensity $I_{p-1}$ less than T, then the sub-pixel location $\tilde{p}$ is equated to:

$$\tilde{p} = p - \frac{I_p - T}{(I_p - I_{p-1})}$$

Next, the enhanced (i.e., sub-pixel-resolution) skin contour 40C is simplified into two compact piece-wise line representations, namely a convex hull and a polygonal approximation.

Figure 16A:
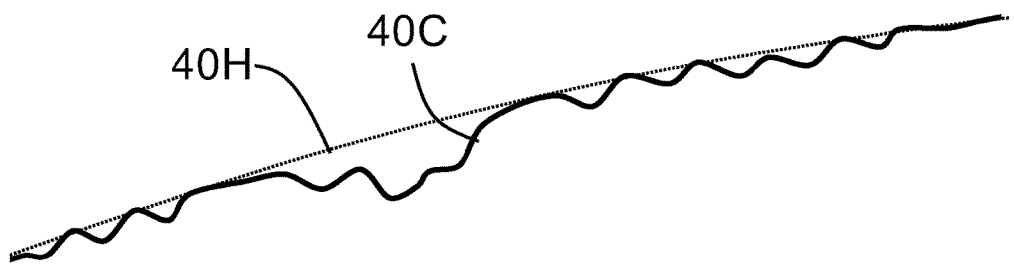
FIG. 16A is similar to FIG. 15 and shows a convex hull in relation to a portion of the skin contour.

FIG. 16A is a close-up view of a portion of ceramic article 10 illustrating skin contour 40C and a convex hull 40H. The convex hull 40H is a set of points in 2D space (in this case, skin contour 40C) that is the smallest convex set that contains all the given points. The convex hull 40H may be visualized as the shape formed by a rubber band stretched around the skin contour. Notice that convex hull 40H, as the name implies, does not trace into concave dents or grooves along skin contour 40C. The convex hull 40H can thus serve as a reference surface for measuring surface shape variations.

Figure 16B:
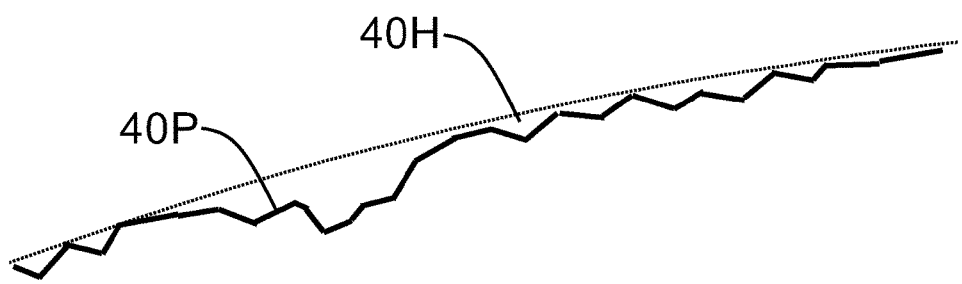
FIG. 16B is similar to FIG. 16A and shows a polygonal approximation to the skin contour.

FIG. 16B is similar to FIG. 16A and shows a polygonal contour 40P that is a polygonal approximation of skin contour 40C shown in FIG. 16A. The polygonal contour 40P provides a tighter piece-wise linear approximation that can handle both convex protrusions and concave depressions in the actual skin contour 40C. A simple polygonal approximation based on an arc merging and splitting technique as is known in the art can be used to form polygonal contour 40P.

The reason for performing linear approximations of skin contour 40C is to evaluate the spatial relationships of convex hull 40H and polygonal contour 40P relative to localized defects (e.g., depressions and bumps) along skin 40.

To this end, let $H=\{h_1, h_2, h_3, \ldots\}$ and $V=\{v_1, v_2, v_3, \ldots\}$ be vertices that form convex hull 40H and polygonal contour 40P of skin contour 40C respectively. The number of convex hull vertices is always less than or equal to the number of polygonal contour vertices.

Fissure Detection

Figure 16C:
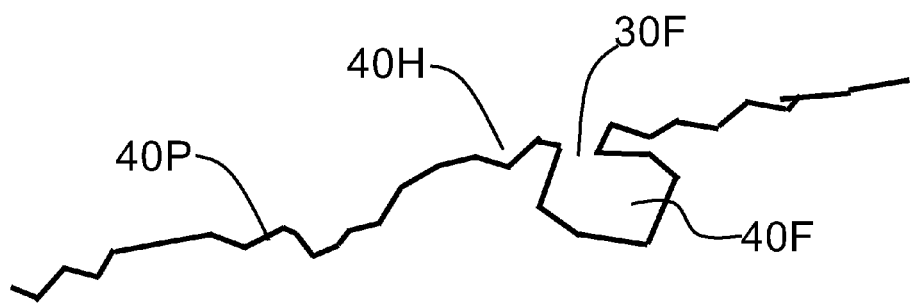
FIG. 16C is similar to FIG. 16B and shows an example of the polygonal approximation that can occur when there is a fissure in the skin.

As noted before, detection of fissure defects 40F is preferably carried out before other skin defect detections and measurements can be performed to obtain the best defect detection results. This is because fissure detection is used to mark all skin contour pixels 124 that form the fissures so that the fissures can be excluded in downstream skin inspection processes. FIG. 16C is similar to FIG. 16B and shows an example of how a fissure defect 40F in skin 40 can cause an erroneous interpretation of skin contour 40C, shown as a fissure surface contour.

Example Fissure Defect Detection Steps

Example fissure defect detection steps are as follows:

1) For each pair of adjacent convex hull vertices, say $h_i$ and $h_{i+1}$, merge these convex hull segment terminal points with all the polygonal approximation vertices between them to form a set of high curvature vertices between $h_i$ and $h_{i+1}$. Let $G=\{h_i, v_k, v_{k+1}, v_{k+2}, \ldots, h_{i+1}\}$ be the calculated set of vertices between $h_i$ and $h_{i+1}$ inclusively.

2) Traverse along G and create triplets of adjacent vertices, e.g., $\{p_{j-1}, p_j, p_{j+1}\}$. Let $\vec{u}=(p_{j-1}-p_j)$ and $\vec{v}=(p_{j+1}-p_j)$. Mark $p_j$ as the start or end location of a fissure, if:

$$\left\| \frac{\vec{u}}{\|\vec{u}\|} \times \frac{\vec{v}}{\|\vec{v}\|} \right\| < D, \text{ and } \cos^{-1}\left( \frac{\vec{u}, \vec{v}}{\|\vec{u}\| \|\vec{v}\|} \right) < 135°$$

If $\{e_1, e_2, e_3, e_4, e_5, \ldots\}$ denotes the vertices that satisfy the aforesaid criteria, then the contour between $e_n$ and $e_{n+1}$ contains potential fissure(s). Let $E=\{(e_1, e_2), (e_3, e_4), \ldots\}$ be the pairs of fissure contour terminal points found within convex hull segment, $h_i$ and $h_{i+1}$.

3) For each vertex pair $(e_n, e_{n+1})$, in E, find contour locations between $e_n$ and $e_{n+1}$ that cross a line connecting $e_n$ and $e_{n+1}$. If such crossing points are found, then insert them between $e_n$ and $e_{n+1}$ according to the order on the contour edge chain sequence. For example, if $q_1$, $q_2$ and $q_3$ are crossing points, then we have $\{e_n, q_1, q_2, q_3, e_{n+1}\}$. Each pair in this set of vertices becomes new potential fissure contour terminal endpoints. For example in $\{e_n, q_1, q_2, q_3, e_{n+1}\}$, we have four candidate fissures between $e_n$ and $q_1$, between $q_1$ and $q_2$, between $q_2$ and $q_3$ and between $q_3$ and $e_{n+1}$ respectively. If there is no crossing point, then there is only one candidate fissure between $e_n$ and $e_{n+1}$. Failure to perform this step to isolate distinct potential fissures so that they can be evaluated individually in Step 4 may result in erroneous fissure segmentation.

4) For each potential fissure contour determined in Step 3, find all the cells the fissure overlaps. Discard all candidates that do not overlap any cell. If the aforesaid cell overlap criterion is ignored, spurious fissures can be eliminated if the maximum depth is too shallow, or if most of the contour points between the fissure terminal vertices are above the line connecting the terminal vertices—meaning that the signed perpendicular distance of most contour points to this line is negative if we traverse the skin in the clockwise direction.

All skin contour pixels 124 that form the fissures are recorded and are not used as skin pixels in ensuing skin inspections. A skin thickness measurement is applied to edge cells 20 only. This measurement determines the shortest distance between the edge cell contour 20C and skin contour 40C. When screening skin contour 40C for the closest point to cell contour 20C, the method preferably skips all fissure contour pixels 124 to avoid an incorrect measurement.

Figure 16D:
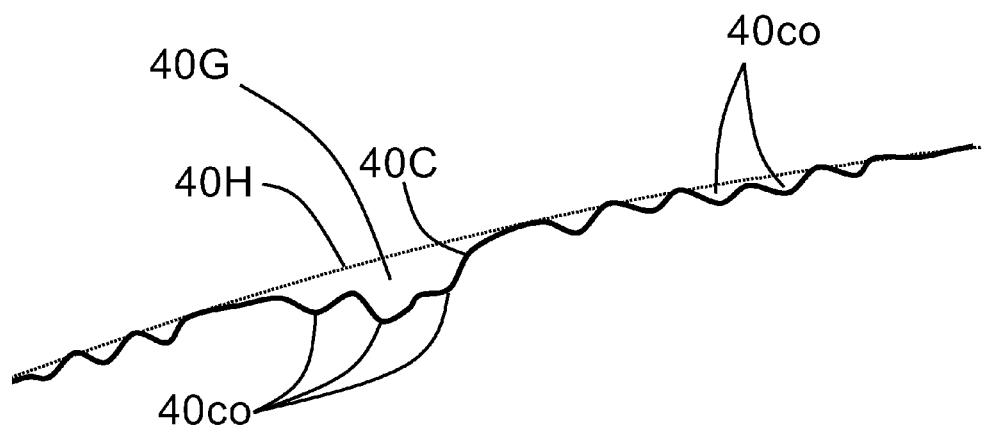
FIG. 16D is similar to FIG. 16A and points out surface grooves and surface corrugations in the surface contour.

FIG. 16D is similar to FIG. 16A and indicates grooves 40G formed in skin contour 40C. Groove detection evaluates the skin contour segment between adjacent convex hull vertices to find the skin contour pixel 124 farthest from the search line SL connecting those terminal convex hull vertices. If the perpendicular distance from the farthest skin pixel 124 to line is greater than or equal to a predefined minimum groove depth threshold, then groove 40G is found between those adjacent convex hull vertices. In an example, fissure contour pixels 124 are not utilized here to avoid detecting a fissure as a false groove (see, e.g., FIG. 16C).

The detection of corrugations 40co is used to identify periodic skin depressions for specific types of substrate with corrugated skin 40. The groove detection method as described above may not be suitable for corrugation inspection because in many cases corrugations 40co are smaller than grooves 40G. This means that many corrugations 40co can be embedded within a single groove 40G, as shown in FIG. 16D. The proposed corrugation detection approach exploits the skin contour polygonal contour 40P shown in FIG. 16B.

Similar to the fissure inspection, the method of detecting corrugations 40co applies the polygonal approximation vertices v between pairs of adjacent convex hull H. Given two adjacent convex hull vertices $h_i$ and $h_{i+1}$, let $C=\{c_1, c_2, c_3, c_4, c_5, c_6, \ldots, c_{M-1}, c_M\}$ be the set of vertices to be examined for corrugations, where $c_1=h_i$ and $c_M=h_{i+1}$, and $c_2$ to $c_{M-1}$ are polygonal approximation vertices V between $h_i$ and $h_{i+1}$. Also let $T_C$ be the pre-defined minimum corrugation depth threshold. Below is an example of a step-by-step corrugation detection procedure applied to c:

1) Assign $c_1$ to s, which represents the start vertex of the next corrugation 40co to be found. Set vertex index i to 2.

2) If i≤M−1, then continue with Step 3, otherwise jump to Step 4.

3) Create two unit vectors using $c_{i-1}$, $c_i$ and $c_{i+1}$, namely, $\vec{u}=(c_{i-1}-c_i)/\|c_{i-1}-c_i\|$ and $\vec{v}=(c_{i+1}-c_i)/\|c_{i+1}-c_i\|$. Calculate the cross product $\vec{u}\times\vec{v}$. If $\vec{u}\times\vec{v}\leq 0$, then find the contour point p between s and $c_i$ farthest to the line connecting s and $c_i$ with the maximum positive signed perpendicular distance d to the line, i.e., p must be beneath the line. If d≥$T_C$, then create a new corrugation 40co for vertex triplet $\{s,p,c_i\}$ and assign $c_i$ to s as the new start vertex of the following corrugation. Increment i and go to Step 2.

4) This step is meant to detect the last remaining corrugation 40co, if any, between $h_i$ and $h_{i+1}$. Find the farthest contour point q between s and $c_M$ beneath the line connecting s and $c_M$. If the perpendicular distance between q and the line is greater than or equal to $T_C$, then create a new corrugation 40co for vertex triplet $\{s,q,c_M\}$.

As set forth herein, various embodiments, or sets of embodiments, are disclosed.

In one set of embodiments, a method is disclosed of inspecting an extruded cellular ceramic article for defects, the extruded cellular ceramic article having a web array comprising webs that define an array of cells, the method comprising: establishing, from a digital image that comprises pixels each having an intensity value, an intensity-based initial web array representation of the web array that does not have sub-pixel resolution; performing an intensity threshold process on the initial web array representation to define an intensity-based high-resolution web array representation of the web array that has sub-pixel resolution; defining corresponding web skeletons for each of the webs by applying piecewise cubic spline fits between knot locations; and comparing intensities of the high-resolution web array representation along the web skeletons to a threshold intensity to determine the location and the size of any defects that may be present, that is, in, or on, the article. In some embodiments, In some embodiments, the establishing comprises defining cell contours by performing a threshold intensity process on the digital image and then establishing from the cell contours the intensity-based initial web array representation.

In some embodiments, each web has a thickness, and in the comparing, the intensity value at a given location of one of the web skeletons is a maximum intensity of intensity values over the width of the web at the given location.

In some embodiments, the defining occurs after the performing, and the method further comprises after the performing but prior to the defining, performing a filtering operation that reduces or eliminates debris from the high-resolution web array representation.

In some embodiments, the knot locations are determined by dividing a given web into segments that are between three and seven pixels long and that comprise edge pair midpoints, and averaging the edge pair midpoints within each segment into the knot location for the segment.

In some embodiments, the method further comprises determining center post locations in the web array, and performing the piece-wise cubic spline fits between adjacent center post locations.

In some embodiments, the method further comprises determining for each web a web curvature, and comparing the determined web curvature to a maximum acceptable web curvature.

In some embodiments, the method further comprises further comprising: calculating a contrast value for each point along each of the web skeletons; and comparing the contrast to a threshold contrast value in determining the location of the at least one defect.

In some embodiments, the method further comprises defining the threshold intensity as a weighted sum of a local cell foreground intensity threshold $T_{Cell}$ and a global web array foreground intensity threshold $T_{NK}$. In some of these embodiments, the threshold intensity is given as $T_{WG}$ and wherein the weighted sum is defined by $T_{WG}=0.8T_{Cell}+0.2T_{NK}$.

In another set of embodiments, a method is disclosed of inspecting an extruded cellular ceramic article for a defect, the extruded cellular ceramic article having a web array surrounded by an outer skin having a shape, the method comprising: establishing from a digital image that comprises pixels each having an intensity value, an intensity-based initial representation of the skin that does not have sub-pixel resolution; performing an intensity threshold process on the initial skin representation using orthogonal projections n to define an intensity-based high-resolution skin representation that has sub-pixel resolution; defining a convex hull and a polygonal approximation of the shape of the skin using the intensity-based high-resolution skin representation; and determining a size and a location of a deviation in the skin shape between the convex hull and the polygonal approximation. In some embodiments, the method further comprises, prior to the determining, identifying one or more fissures and excluding the one or more fissures from the high-resolution skin representation.

In some embodiments, the skin shape comprises corrugations and wherein the at least one deviation in the skin shape accounts for the corrugations.

In some embodiments, the method further comprises determining a size of the at least one deviation as a maximum distance between the convex hull and the polygonal approximation.

In some embodiments, the method further comprises determining a skin thickness based on the intensity-based high-resolution skin representation.

In another set of embodiments, a method is disclosed of inspecting an extruded cellular ceramic article for a non-knitter defect, the extruded cellular ceramic article having a web array comprising webs that define an array of cells, the method comprising: establishing from a digital image that comprises pixels each having an intensity value and web edges, a web array skeleton that traverses the web array and that has intensity values at each point along the web array skeleton, wherein the intensity values are defined by either a maximum intensity or an average intensity between the web edges at the given point; determining contrast values from the intensity values of the web array skeleton; and comparing the intensity values and the contrast values of the web array skeleton to a non-knitter threshold intensity and a contrast threshold, respectively, to determine the location of the defect.

In some embodiments, the non-knitter threshold intensity is a weighted average.

In some embodiments, the method further comprises defining the non-knitter threshold intensity as a weighted sum of a local cell foreground intensity threshold $T_{Cell}$ and a global web array foreground intensity threshold $T_{NK}$.

In some embodiments, the non-knitter threshold intensity is given as $T_{WG}$ and wherein the weighted sum is defined by $T_{WG}=0.8T_{Cell}+0.2T_{NK}$.

In some embodiments, the contrast values are determined for each point along the web array skeleton as a maximum difference in the intensity values found between a given one of the points and a number N of previous points, where N can range from 2 to 8.

In another set of embodiments, a method is disclosed of determining a location and a size of at least one defect in an extruded cellular ceramic article having a web array defined by webs that define an array of cells, comprising: a) capturing a digital image of the web array, wherein the digital image includes pixels each having an intensity value; b) establishing from the captured digital image an intensity-based initial web array representation of the web array that does not have sub-pixel resolution; c) performing an intensity threshold process on the initial web array representation to define an intensity-based high-resolution web array representation of the web array that has sub-pixel resolution; d) performing, for each of the webs, piecewise cubic spline fits between knot locations to define corresponding web skeletons; and e) comparing intensities of the high-resolution web array representation along the web skeletons to a threshold intensity to determine the location and the size of the at least one defect.

In some embodiments, act b) includes defining cell contours by performing a threshold intensity process on the digital image and then establishing from the cell contours the intensity-based initial web array representation.

In some embodiments, each web has a thickness, and wherein in act e), the intensity value at a given location of one of the web skeletons is a maximum intensity of intensity values over the width of the web at the given location.

In some embodiments, the method further comprises, after act c) but prior to act d), performing a filtering operation that reduces or eliminates debris from the high-resolution web array representation.

In some embodiments, the knot locations are determined by dividing a given web into segments that are between three and seven pixels long and that include edge pair midpoints, and averaging the edge pair midpoints within each segment into the knot location for the segment.

In some embodiments, the method further comprises determining center post locations in the web array, and performing the piece-wise cubic spline fits between adjacent center post locations.

In some embodiments, the method further comprises determining for each web a web curvature, and comparing the determined web curvature to a maximum acceptable web curvature.

In some embodiments, the method further comprises calculating a contrast value for each point along each of the web skeletons; and comparing the contrast to a threshold contrast value in determining the location of the at least one defect.

In some embodiments, the method further comprises defining the threshold intensity as a weighted sum of a local cell foreground intensity threshold $T_{Cell}$ and a global web array foreground intensity threshold $T_{NK}$.

In some embodiments, the threshold intensity is given as $T_{WG}$ and wherein the weighted sum is defined by $T_{WG}=0.8T_{Cell}+0.2T_{NK}$.

In another set of embodiments, a method is disclosed of determining a location and a size of at least one defect in an extruded cellular ceramic article having a web array surrounded by an outer skin having a shape, comprising: a) capturing a digital image of the outer skin, wherein the digital image includes pixels each having an intensity value; b) establishing from the captured digital image an intensity-based initial representation of the skin that does not have sub-pixel resolution; c) performing an intensity threshold process on the initial skin representation using orthogonal projections n to define an intensity-based high-resolution skin representation that has sub-pixel resolution; d) defining a convex hull and a polygonal approximation of the shape of the skin using the intensity-based high-resolution skin representation; and e) determining at least a size and at least a location of at least one deviation in the skin shape between the convex hull and the polygonal approximation.

In some embodiments, the method further comprises prior to act e), identifying one or more fissures and excluding the one or more fissures from the high-resolution skin representation.

In some embodiments, the skin shape includes corrugations and wherein the at least one deviation in the skin shape accounts for the corrugations.

In some embodiments, the method further comprises determining a size of the at least one deviation as a maximum distance between the convex hull and the polygonal approximation.

In some embodiments, the method further comprises determining a skin thickness based on the intensity-based high-resolution skin representation.

In another set of embodiments, a method is disclosed of determining a location of at least one non-knitter defect in an extruded cellular ceramic article having a web array defined by webs that define an array of cells, comprising: a) capturing a digital image of the web array, wherein the digital image includes pixels each having an intensity value and includes web edges; b) establishing from the captured digital image a web array skeleton that traverses the web array and that has intensity values at each point along the web array skeleton, wherein the intensity values are defined by either a maximum intensity or an average intensity between the web edges at the given point; c) determining contrast values from the intensity values of the web array skeleton; and d) comparing the intensity values and the contrast values of the web array skeleton to a non-knitter threshold intensity and a contrast threshold, respectively, to determine the location of the at least one non-knitter defect.

In some embodiments, the non-knitter threshold intensity is a weighted average.

In some embodiments, the method further comprises defining the non-knitter threshold intensity as a weighted sum of a local cell foreground intensity threshold $T_{Cell}$ and a global web array foreground intensity threshold $T_{NK}$.

In some embodiments, the non-knitter threshold intensity is given as $T_{WG}$ and wherein the weighted sum is defined by $T_{WG}=0.8T_{Cell}+0.2T_{NK}$.

In some embodiments, the contrast values are determined for each point along the web array skeleton as a maximum difference in the intensity values found between a given one of the points and a number N of previous points, where N can range from 2 to 8.

Advantages

The defect detection and measurement methods disclosed herein offer a number of advantages, such as automated inspection, accurate quantification of non-conformities in a ceramic article as compared to the manufacturing specifications, and an increase in quality of the ceramic articles produced through feed-back forming process control.

The methods can also provide a cost saving advantage when applied to pre-plugged filters since any non-knitter defect will produce a known non-filtering path for soot or particles traveling through the filter after plugging. Knowing the location and existence of a non-knitter defect in the plugging process presents the opportunity to plug the adjacent channel and hence disable or block this known alternative path. These known paths are detected in the final quality assurance phase of our manufacturing process. Parts with alternative soot paths are rejected and can be repaired or have these channels disabled before final testing, thus producing a lower overall percentage of rejected ware.

Proper detection and measurement of the web array and skin defects can provide an understanding of how the ceramic article will perform under operating conditions that subject the ceramic article to thermal and mechanical stress. This in turn helps identify non-conforming ceramic articles and determine whether or not they are unusable. In addition, the rapid detection and characterization of defects can be used as feedback to adjust the upstream process to prevent further defects from occurring in subsequently produced ceramic articles.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of inspecting an extruded cellular ceramic article for defects, the extruded cellular ceramic article having a web array comprising webs that define an array of cells, the method comprising:
    establishing, from a digital image that comprises pixels each having an intensity value, an intensity-based initial web array representation of the web array that does not have sub-pixel resolution;
    performing an intensity threshold process on the initial web array representation to define an intensity-based high-resolution web array representation of the web array that has sub-pixel resolution;
    defining corresponding web skeletons for each of the webs by applying piecewise cubic spline fits between knot locations; and
    comparing intensities of the high-resolution web array representation along the web skeletons to a threshold intensity to determine the location and the size of any defects that may be present in or on the article.

2. The method according to claim 1, wherein the establishing comprises defining cell contours by performing a threshold intensity process on the digital image and then establishing from the cell contours the intensity-based initial web array representation.

3. The method according to claim 1, wherein each web has a thickness, and wherein in the comparing, the intensity value at a given location of one of the web skeletons is a maximum intensity of intensity values over the width of the web at the given location.

4. The method according to claim 1, wherein the defining occurs after the performing, and the method further comprises after the performing but prior to the defining, performing a filtering operation that reduces or eliminates debris from the high-resolution web array representation.

5. The method according to claim 1, wherein the knot locations are determined by dividing a given web into segments that are between three and seven pixels long and that comprise edge pair midpoints, and averaging the edge pair midpoints within each segment into the knot location for the segment.

6. The method according to claim 1, further comprising determining center post locations in the web array, and performing the piece-wise cubic spline fits between adjacent center post locations.

7. The method according to claim 1, further comprising determining for each web a web curvature, and comparing the determined web curvature to a maximum acceptable web curvature.

8. The method according to claim 1, further comprising:
    calculating a contrast value for each point along each of the web skeletons; and
    comparing the contrast to a threshold contrast value in determining the location of the at least one defect.

9. The method according to claim 1, comprising defining the threshold intensity as a weighted sum of a local cell foreground intensity threshold $T_{Cell}$ and a global web array foreground intensity threshold $T_{NK}$.

10. The method according to claim 9, wherein the threshold intensity is given as $T_{WG}$ and wherein the weighted sum is defined by $T_{WG}=0.8T_{Cell}+0.2T_{NK}$.

* * * * *

UNITED STATES PATENT AND TRADEMARK OFFICE
CERTIFICATE OF CORRECTION

PATENT NO. : 9,996,766 B2
APPLICATION NO. : 15/139931
DATED : June 12, 2018
INVENTOR(S) : DiRisio Carlo Richard et al.

Page 1 of 1

It is certified that error appears in the above-identified patent and that said Letters Patent is hereby corrected as shown below:

On the Title Page

In Column 1, item (12), delete "Richard et al." and insert -- DiRisio et al. --, therefor.

In Column 1, item (72), Inventors, Line 1, delete "DiRisio Carlo Richard," and insert -- Carlo Richard DiRisio, --, therefor.

In Column 1, item (72), Inventors, Line 2, delete "Frey Julie Charmaine," and insert -- Julie Charmaine Frey, --, therefor.

In Column 1, item (72), Inventors, Line 3, delete "Gehl Kristine Sluder," and insert -- Kristine Sluder Gehl, --, therefor.

Signed and Sealed this
Third Day of September, 2024

Katherine Kelly Vidal
*Director of the United States Patent and Trademark Office*